(12) United States Patent
Li et al.

(10) Patent No.: US 11,044,016 B2
(45) Date of Patent: Jun. 22, 2021

(54) DATA TRANSMISSION METHOD, APPARATUS, AND SYSTEM

(71) Applicant: HUAWEI TECHNOLOGIES CO., LTD., Shenzhen (CN)

(72) Inventors: Zhengyu Li, Shenzhen (CN); Changzheng Su, Shenzhen (CN); Liangliang Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/717,427

(22) Filed: Dec. 17, 2019

(65) Prior Publication Data

US 2020/0127737 A1   Apr. 23, 2020

Related U.S. Application Data

(63) Continuation of application No. PCT/CN2018/090544, filed on Jun. 11, 2018.

(30) Foreign Application Priority Data

Jun. 20, 2017   (CN) .......................... 201710467962.1

(51) Int. Cl.
*H04B 10/50*   (2013.01)
*G02B 27/28*   (2006.01)
(Continued)

(52) U.S. Cl.
CPC ......... *H04B 10/505* (2013.01); *G02B 27/283* (2013.01); *H04B 10/6162* (2013.01); *H04B 10/70* (2013.01)

(58) Field of Classification Search
CPC .... G02B 27/283; H04B 10/50; H04B 10/505; H04B 10/60; H04B 10/6162; H04B 10/70; H04J 14/06; H04L 9/08
(Continued)

(56) References Cited

U.S. PATENT DOCUMENTS 8,457,316 B2 * 6/2013 Brodsky ............... H04L 9/0858
380/278
9,553,677 B1 * 1/2017 Soh ........................ H04B 10/70
(Continued)

FOREIGN PATENT DOCUMENTS

CN   104065475 A   9/2014
CN   205039835 U   2/2016
(Continued)

OTHER PUBLICATIONS

Liu et al; Continuous-variable quantum key distribution under strong channel polarization disturbance; Sep. 2020; Physical Review A102; pp. 1-7. (Year: 2020).*

(Continued)

*Primary Examiner* — Amritbir K Sandhu
(74) *Attorney, Agent, or Firm* — Stein IP, LLC

(57) ABSTRACT

A data transmission method to avoid a channel resource waste where first random data and second random data are generated by a sending device; at least two pieces of reference data are determined; a modulation signal based on the first random data, the second random data, and the at least two pieces of reference data are generated; a component in a first polarization direction and a component in a second polarization direction of a first laser signal by using the modulation signal are modulated by the sending device, to obtain a second laser signal, where the first polarization direction and the second polarization direction are perpendicular to each other, and the second laser signal includes a quantum light and a reference light; and the second laser signal is sent by the sending device.

20 Claims, 21 Drawing Sheets

(51) Int. Cl.
*H04B 10/61* (2013.01)
*H04B 10/70* (2013.01)

(58) Field of Classification Search
USPC .................................. 398/140, 141, 152, 161
See application file for complete search history.

(56) References Cited

U.S. PATENT DOCUMENTS

| | | | | |
|---|---|---|---|---|
| 10,778,341 | B2* | 9/2020 | Su | H04B 10/2537 |
| 10,805,075 | B2* | 10/2020 | Alleaume | H04L 9/0852 |
| 2005/0047601 | A1* | 3/2005 | Shields | H04B 10/70 380/283 |
| 2005/0180575 | A1* | 8/2005 | Maeda | H04L 7/0075 380/278 |
| 2006/0290941 | A1* | 12/2006 | Kesler | H04B 10/70 356/491 |
| 2007/0009098 | A1* | 1/2007 | Tanaka | H04L 9/0858 380/30 |
| 2007/0076884 | A1* | 4/2007 | Wellbrock | H04L 9/0855 380/263 |
| 2008/0052577 | A1* | 2/2008 | Tanaka | H04L 9/0852 714/728 |
| 2009/0268901 | A1* | 10/2009 | Lodewyck | H04L 9/0852 380/41 |
| 2011/0317836 | A1* | 12/2011 | Yeh | H04L 9/12 380/256 |
| 2016/0164615 | A1 | 6/2016 | Dailey et al. | |
| 2017/0237505 | A1* | 8/2017 | Lucamarini | H04B 10/5161 398/185 |
| 2018/0294961 | A1* | 10/2018 | Wang | H04L 9/0852 |
| 2019/0028206 | A1* | 1/2019 | Su | H04B 10/6151 |
| 2020/0044750 | A1* | 2/2020 | Cai | H04B 10/85 |
| 2020/0044836 | A1* | 2/2020 | Kim | H04L 9/12 |
| 2020/0204362 | A1* | 6/2020 | Li | H04L 9/0852 |
| 2020/0213105 | A1* | 7/2020 | Li | H04L 9/0852 |
| 2020/0266978 | A1* | 8/2020 | Li | H04L 9/0662 |
| 2020/0304300 | A1* | 9/2020 | Rhee | H04L 9/0858 |

FOREIGN PATENT DOCUMENTS

| | | |
|---|---|---|
| CN | 106533676 A | 3/2017 |
| CN | 106788984 A | 5/2017 |
| CN | 106850213 A | 6/2017 |
| CN | 106850217 A | 6/2017 |
| JP | 2014068284 A | 4/2014 |
| WO | 2016099565 A1 | 6/2016 |

OTHER PUBLICATIONS

Adrien Marie et al: "Self-coherent phase reference sharing for continuous-variable quantum key distribution", Physical Review A, vol. 95, No. 1, Jan. 17, 2017 (Jan. 17, 2017), XP055685826, total 15 pages.

Zhang G et al: "An integrated photonic chip for continuous-variable quantum key distribution", 2017 Conference on Lasers and Electro-Optics (CLEO), The Optical Society, May 14, 2017 (May 14, 2017), pp. 1-2, XP033238800.

Daniel BS Soh et al., "Self-referenced continuous-variable quantum key distribution protocol", Physical Review X , Oct. 29, 2015, pp. 1-15.

Chao Wang et al. "25 MHz clock continuous-variable quantum key distribution system over 50 km fiber channel", Scientific Reports, Published: Sep. 30, 2015. total 8 pages.

Bing Qi et al. "Generating the Local Oscillator "Locally" in Continuous-Variable Quantum Key Distribution Based on Coherent Detection", Physical Review X 5, 041009 (2015). pp. 1-12.

Amnon Yariv, et al. Photonics: Optical Electronics in Modern Communications, Sixth Edition , 2007. total 849 pages.

* cited by examiner

DATA TRANSMISSION METHOD, APPARATUS, AND SYSTEM

CROSS-REFERENCE TO RELATED APPLICATIONS

This application is a continuation of International Application No. PCT/CN2018/090544, filed on Jun. 11, 2018, which claims priority to Chinese Patent Application No. 201710467962.1, filed on Jun. 20, 2017. The disclosures of the aforementioned applications are hereby incorporated by reference in their entireties.

TECHNICAL FIELD

This application relates to the field of communications technologies, and in particular, to a data transmission method, an apparatus, and a system.

BACKGROUND

With acceleration of informatization, communication is increasingly frequent, and people impose an increasingly high requirement on communication security. In secure quantum communications, a quantum feature and a conventional password are combined, and communication security is ensured by using a basic principle and a feature of quantum mechanics. A quantum key distribution (QKD) technology is a current most practical secure quantum communications technology, and the QKD technology is to implement unconditional security distribution of a symmetric key on the premise that some security keys have been shared.

Currently, a solution of self-referenced continuous-variable quantum key distribution (SR-CV-QKD) is provided. A core idea of the SR-CV-QKD is as follows: A sending device loads to-be-transmitted quantum key data to a quantum light on a component in a polarization direction, and then introduces a reference light pulse with a relatively strong light intensity between two quantum lights. In this case, a receiving device detects a frequency offset and a phase difference between a sent laser light and a local oscillator light generated by the receiving device, and corrects a key by using the information, so that the two parties share strongly related initial keys. In addition, before detecting the information, the receiving device performs, by using a polarization controller, frequency stabilization on the laser light sent by the sending device and the local oscillator light generated by the receiving device. A reference light pulse and an adjacent quantum light pulse are very close in time domain, and both are transmitted through a same segment of channel. Therefore, it may be approximately considered that a phase that changes in a transmission process of the reference light pulse is consistent with that of the adjacent quantum light pulse, or an average phase of two adjacent reference light pulses is used to replace a phase of an intermediate quantum light pulse.

However, in the foregoing solution, the sending device codes the quantum key data in only one polarization direction, and the other polarization direction is idle. Consequently, channel resources are not fully used, and a channel resource waste is caused.

SUMMARY

This application provides a data transmission method, an apparatus, and a system, so as to avoid a channel resource waste.

According to a first aspect, this application provides a data transmission method, where the method includes: generating, by a sending device, first random data and second random data; determining, by the sending device, at least two pieces of reference data, where any two of the at least two pieces of reference data meet the following condition: one piece of reference data $(X_1, X_2, Y_1, Y_2)^T$ is different from the other piece of reference data $(X_3, X_4, Y_3, Y_4)^T$ in the any two pieces of reference data, and a matrix $$\begin{pmatrix} X_1 & X_2 & Y_1 & Y_2 \\ X_2 & -X_1 & Y_2 & -Y_1 \\ X_3 & X_4 & Y_3 & Y_4 \\ X_4 & -X_3 & Y_4 & -Y_3 \end{pmatrix}$$

constituted by $(X_1, X_2, Y_1, Y_2)^T$ and $(X_3, X_4, Y_3, Y_4)^T$ is a full-rank matrix; generating, by the sending device, a modulation signal based on the first random data, the second random data, and the at least two pieces of reference data; modulating, by the sending device, a component in a first polarization direction and a component in a second polarization direction of a first laser signal by using the modulation signal, to obtain a second laser signal, where the first polarization direction and the second polarization direction are perpendicular to each other, and the second laser signal includes a quantum light and a reference light, where each calculation period in the second laser signal includes one group of quantum lights and two groups of reference lights, the group of quantum lights is loaded with the first random data in the first polarization direction, and the group of quantum lights is loaded with the second random data in the second polarization direction; a first group of reference lights in the two groups of reference lights is loaded with $X_1$ on an x component in the first polarization direction, the first group of reference lights is loaded with $X_2$ on a p component in the first polarization direction, the first group of reference lights is loaded with $Y_1$ on an x component in the second polarization direction, and the first group of reference lights is loaded with $Y_2$ on a p component in the second polarization direction; and a second group of reference lights in the two groups of reference lights is loaded with $X_3$ on the x component in the first polarization direction, the second group of reference lights is loaded with $X_4$ on the p component in the first polarization direction, the second group of reference lights is loaded with $Y_3$ on the x component in the second polarization direction, and the second group of reference lights is loaded with $Y_4$ on the p component in the second polarization direction; and sending, by the sending device, the second laser signal.

According to this data transmission method provided in this application, the sending device modulates the components in the two perpendicular polarization directions of the first laser signal, so that the obtained second laser signal is loaded with the two pieces of independent random data respectively in the two polarization directions. Because the two polarization directions are perpendicular to each other, and there is no crosstalk between the two polarization directions, channel resources are fully used without affecting system security. In this way, a system key rate is doubled, and a channel resource waste is avoided.

Optionally, before the modulating, by the sending device, a component in a first polarization direction and a component in a second polarization direction of a first laser signal by using the modulation signal, to obtain a second laser signal, the method further includes: splitting, by the sending device, the first laser signal into a component light in the first polarization direction and a component light in the second polarization direction.

Optionally, the splitting, by the sending device, the first laser signal into a component light in the first polarization direction and a component light in the second polarization direction includes: splitting, by the sending device, the first laser signal into the component light in the first polarization direction and the component light in the second polarization direction by using a polarization beam splitter PBS or a beam splitter BS.

In the foregoing two optional manners, the sending device may first split the first laser signal into the component light in the first polarization direction and the component light in the second polarization direction for separate modulation, so as to improve accuracy of modulating the first laser signal in the two polarization directions.

Optionally, a quantity of modulation signals is 2, and the modulating, by the sending device, a first laser signal by using the modulation signal, to obtain a second laser signal includes: splitting, by the sending device, the first laser signal into the component light in the first polarization direction and the component light in the second polarization direction; modulating, by the sending device, the component light in the first polarization direction by using a first modulation signal of the two modulation signals, and modulating the component light in the second polarization direction by using a second modulation signal of the two modulation signals; performing, by the sending device, 90° polarization rotation on a modulated component light in the first polarization direction; delaying, by the sending device, a modulated component light in the second polarization direction, so that the modulated component light in the first polarization direction overlaps with the modulated component light in the second polarization direction in time domain; and performing, by the sending device, beam combination on a component light in the first polarization direction that is obtained after the 90° polarization rotation and a delayed component light in the second polarization direction, to obtain the second laser signal.

In this optional manner, the sending device generates the separate modulation signals for the first laser signal in the two polarization directions, so as to improve accuracy of modulating the first laser signal in the two polarization directions.

Optionally, the generating, by the sending device, a modulation signal based on the first random data, the second random data, and the at least two pieces of reference data includes: determining, by the sending device based on a channel feature, a mode of combination between a signal used to generate a reference light and a signal used to generate a quantum light, where the channel feature is a feature of a channel for transmitting the second laser signal; and permuting and combining, by the sending device, the first random data, the second random data, and the at least two pieces of reference data according to the combination mode, to generate the modulation signal.

In this optional manner, the sending device determines the mode of combination between the reference light and the quantum light based on the channel feature, and when a receiving device analyzes, based on the reference light, a channel feature change of the quantum light, analysis accuracy can be improved.

Optionally, the combination mode is a time division mode, and the time division mode includes a quantity of signals used to generate a quantum light, a quantity of signals used to generate a reference light, and the signal used to generate the quantum light and the signal used to generate the reference light.

Optionally, the combination mode includes a frequency division mode, and the frequency division mode includes a quantity of signals used to generate a quantum light, a quantity of signals used to generate a reference light, and a frequency-domain distribution manner of the signal used to generate the quantum light and the signal used to generate the reference light.

Optionally, the method further includes: receiving, by the sending device, a first correction parameter sent by a receiving device; and performing, by the sending device, data correction on the first random data and the second random data based on the first correction parameter.

Optionally, the method further includes: receiving, by the sending device, a first correction parameter sent by a receiving device; obtaining, by the sending device, a second correction parameter, and performing, by the sending device, data correction on the first random data and the second random data based on the second correction parameter and the first correction parameter.

Optionally, the method further includes: obtaining, by the sending device, a second correction parameter, and performing, by the sending device, data correction on the first random data and the second random data based on the second correction parameter.

In the foregoing three optional manners, the sending device can correct the first random data and the second random data by using the first correction parameter and/or the second correction parameter, so that random data of the sending device is maximally associated with random data of the receiving device. In this way, the receiving device does not need to adjust a polarization of a light pulse by using a polarization controller.

According to a second aspect, this application provides a data transmission method, where the method includes: receiving, by a receiving device, a second laser signal, where the second laser signal includes a quantum light and a reference light; performing, by the receiving device, coherent detection on the second laser signal, to obtain third random data and fourth random data from the quantum light and obtain detection data from the reference light; obtaining, by the receiving device, reference data of the reference light, where the reference data is used when the sending device modulates the reference light; and calculating, by the receiving device, a first correction parameter based on the reference data of the reference light and the detection data, where each group of quantum lights and two groups of reference lights in the second laser signal constitute one calculation period, reference data $(X_1, X_2, Y_1, Y_2)^T$ of a first group of reference lights in the two groups of reference lights is different from reference data $(X_3, X_4, Y_3, Y_4)^T$ of a second group of reference lights in the two groups of reference lights, and a matrix $$\begin{pmatrix} X_1 & X_2 & Y_1 & Y_2 \\ X_2 & -X_1 & Y_2 & -Y_1 \\ X_3 & X_4 & Y_3 & Y_4 \\ X_4 & -X_3 & Y_4 & -Y_3 \end{pmatrix}$$

is a full-rank matrix; $X_1$ is reference data with which the first group of reference lights is loaded on an x component in a first polarization direction, $X_2$ is reference data with which the first group of reference lights is loaded on a p component in the first polarization direction, $Y_1$ is reference data with which the first group of reference lights is loaded on an x component in a second polarization direction, and $Y_2$ is reference data with which the first group of reference lights is loaded on a p component in the second polarization direction; and $X_3$ is reference data with which the second group of reference lights is loaded on the x component in the first polarization direction, $X_4$ is reference data with which the second group of reference lights is loaded on the p component in the first polarization direction, $Y_3$ is reference data with which the second group of reference lights is loaded on the x component in the second polarization direction, and $Y_4$ is reference data with which the second group of reference lights is loaded on the p component in the second polarization direction.

According to the data transmission method provided in this application, because the sending device separately loads the two pieces of independent random data in the two perpendicular polarization directions of the second laser signal, the receiving device can obtain the third random data and the fourth random data from the second laser signal. Because the two polarization directions are perpendicular to each other, and there is no crosstalk between the two polarization directions, channel resources are fully used without affecting system security. In this way, a system key rate is doubled, and a channel resource waste is avoided.

Optionally, the detection data includes a first part of detection data and a second part of detection data, and the performing, by the receiving device, coherent detection on the second laser signal, to obtain third random data and fourth random data from the quantum light and obtain detection data from the reference light includes: splitting, by the receiving device, the second laser signal into a first optical signal and a second optical signal; performing, by the receiving device, coherent detection on the first optical signal in a first coherent detection manner, to obtain the first part of detection data from a reference light in the first optical signal and obtain the third random data and the fourth random data from a quantum light in the first optical signal; and performing, by the receiving device, coherent detection on the second optical signal in a second coherent detection manner, to obtain the second part of detection data from a reference light in the second optical signal.

In this optional manner, a detector in the receiving device does not need to detect both a weak light and a relatively strong reference light, and splits the second laser signal into the first optical signal and the second optical signal, to detect only the reference light in the second optical signal. This narrows a detection interval.

Optionally, after the calculating, by the receiving device, a first correction parameter based on the reference data of the reference light and the detection data, the method further includes: sending, by the receiving device, the first correction parameter to the sending device.

Optionally, after the calculating, by the receiving device, a first correction parameter based on the reference data of the reference light and the detection data, the method further includes: performing, by the receiving device, data correction on the third random data and the fourth random data based on the first correction parameter.

Optionally, after the receiving device obtains the third random data and the fourth random data, the method further includes: obtaining, by the receiving device, a second correction parameter; and performing, by the receiving device, data correction on the third random data and the fourth random data based on the second correction parameter.

Optionally, after the calculating, by the receiving device, a first correction parameter based on the reference data of the reference light and the detection data, the method further includes: obtaining, by the receiving device, a second correction parameter; and performing, by the receiving device, data correction on the third random data and the fourth random data based on the first correction parameter and the second correction parameter.

In the foregoing three optional manners, the receiving device does not need to adjust a polarization of a light pulse by using a polarization controller, and may directly calculate the first modification parameter by using the detected detection data and the reference data of the reference light. The first correction parameter represents impact of a polarization direction, a phase, and the like that occurs when a light is transmitted on a channel and the receiving device. Then, the receiving device corrects the third random data and the fourth random data by using the first correction parameter and/or the second correction parameter, so that random data of the sending device is maximally associated with random data of the receiving device.

According to a third aspect, this application further provides a sending device. The sending device may include units configured to perform the method steps in the first aspect and the implementations of the first aspect, for example, a generation unit, a modulation unit, a sending unit, a receiving unit, a correction unit, an obtaining unit, and a beam splitting unit.

For technical effects of the sending device provided in this application, refer to the technical effects of the first aspect or the implementations of the first aspect. Details are not described herein again.

According to a fourth aspect, this application further provides a receiving device. The receiving device may include units configured to perform the method steps in the second aspect and the implementations of the second aspect, for example, a receiving unit, a detection unit, an obtaining unit, a calculation unit, a correction unit, and a beam splitting unit.

For technical effects of the receiving device provided in this application, refer to the technical effects of the second aspect or the implementations of the second aspect. Details are not described herein again.

According to a fifth aspect, this application further provides a sending device, including: a processor, a modulator, a random data source, and a light source. The light source is configured to transmit a first laser signal. The random data source is configured to generate first random data and second random data. The processor is configured to: determine at least two pieces of reference data, and generate a modulation signal based on the first random data, the second random data, and the at least two pieces of reference data. Any two of the at least two pieces of reference data meet the following condition: One piece of reference data $(X_1, X_2, Y_1, Y_2)^T$ is different from the other piece of reference data $(X_3, X_4, Y_3, Y_4)^T$ in the any two pieces of reference data, and a matrix $$\begin{pmatrix} X_1 & X_2 & Y_1 & Y_2 \\ X_2 & -X_1 & Y_2 & -Y_1 \\ X_3 & X_4 & Y_3 & Y_4 \\ X_4 & -X_3 & Y_4 & -Y_3 \end{pmatrix}$$

constituted by $(X_1, X_2, Y_1, Y_2)^T$ and $(X_3, X_4, Y_3, Y_4)^T$ is a full-rank matrix. The modulator is configured to: modulate a component in a first polarization direction and a component in a second polarization direction of the first laser signal by using the modulation signal, to obtain a second laser signal; and send the second laser signal. Each calculation period in the second laser signal includes one group of quantum lights and two groups of reference lights, the group of quantum lights is loaded with the first random data in the first polarization direction, and the group of quantum lights is loaded with the second random data in the second polarization direction. A first group of reference lights in the two groups of reference lights is loaded with $X_1$ on an x component in the first polarization direction, the first group of reference lights is loaded with $X_2$ on a p component in the first polarization direction, the first group of reference lights is loaded with $Y_1$ on an x component in the second polarization direction, and the first group of reference lights is loaded with $Y_2$ on a p component in the second polarization direction. A second group of reference lights in the two groups of reference lights is loaded with $X_3$ on the x component in the first polarization direction, the second group of reference lights is loaded with $X_4$ on the p component in the first polarization direction, the second group of reference lights is loaded with $Y_3$ on the x component in the second polarization direction, and the second group of reference lights is loaded with $Y_4$ on the p component in the second polarization direction. The sending device sends the second laser signal.

For technical effects of the sending device provided in this application, refer to the technical effects of the first aspect or the implementations of the first aspect. Details are not described herein again.

According to a sixth aspect, this application further provides a receiving device, including: a processor, a detector, a locally local oscillator light source, and the like. The detector is configured to receive a second laser signal, and the second laser signal includes a quantum light and a reference light. The locally local oscillator light source is configured to transmit an LLO. The detector is further configured to perform coherent detection on the second laser signal by using the LLO, to obtain third random data and fourth random data from the quantum light and obtain detection data from the reference light. The processor is configured to: obtain reference data of the reference light, and calculate a first correction parameter based on the reference data of the reference light and the detection data. The reference data is used when the sending device modulates the reference light. Each group of quantum lights and two groups of reference lights in the second laser signal constitute one calculation period, reference data $(X_1, X_2, Y_1, Y_2)^T$ of a first group of reference lights in the two groups of reference lights is different from reference data $(X_3, X_4, Y_3, Y_4)^T$ of a second group of reference lights in the two groups of reference lights, and a matrix $$\begin{pmatrix} X_1 & X_2 & Y_1 & Y_2 \\ X_2 & -X_1 & Y_2 & -Y_1 \\ X_3 & X_4 & Y_3 & Y_4 \\ X_4 & -X_3 & Y_4 & -Y_3 \end{pmatrix}$$

is a full-rank matrix. $X_1$ is reference data with which the first group of reference lights is loaded on an x component in a first polarization direction, $X_2$ is reference data with which the first group of reference lights is loaded on a p component in the first polarization direction, $Y_1$ is reference data with which the first group of reference lights is loaded on an x component in a second polarization direction, and $Y_2$ is reference data with which the first group of reference lights is loaded on a p component in the second polarization direction. $X_3$ is reference data with which the second group of reference lights is loaded on the x component in the first polarization direction, $X_4$ is reference data with which the second group of reference lights is loaded on the p component in the first polarization direction, $Y_3$ is reference data with which the second group of reference lights is loaded on the x component in the second polarization direction, and $Y_4$ is reference data with which the second group of reference lights is loaded on the p component in the second polarization direction.

Therefore, the data transmission method in the implementations of the second aspect is implemented, and the detector is configured to detect the received second laser signal by using a local oscillator light output by the locally local oscillator light source.

For technical effects of the receiving device provided in this application, refer to the technical effects of the second aspect or the implementations of the second aspect. Details are not described herein again.

According to a seventh aspect, this application further provides a computer storage medium. The computer storage medium may store a program, and when the program is executed, some or all of the steps in each embodiment of the data transmission method provided in this application may be implemented.

According to an eighth aspect, this application further provides a communications system, including the sending device in the third aspect or any implementation of the third aspect and the receiving device in the fourth aspect or any implementation of the fourth aspect, or the sending device in the fifth aspect and the receiving device in the sixth aspect.

DESCRIPTION OF EMBODIMENTS

First, the terms "system" and "network" may be usually used interchangeably in this specification. The character "/" in this specification usually indicates an "or" relationship between associated objects. The term "and/or" in this specification describes only an association relationship for describing associated objects and represents that three relationships may exist. For example, A and/or B may represent three cases: Only A exists, both A and B exist, and only B exists.

In addition, the terms "including" and "having" and any other variants thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
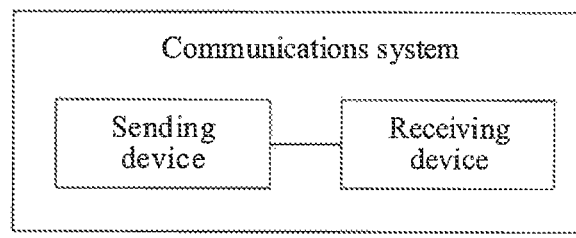
FIG. 1 is a schematic structural diagram of a communications system according to this application.

In addition, a data transmission method provided in this application may be applied to a quantum communications system. FIG. 1 is a block diagram of a communications system according to this application. The communications system includes at least one sending device and at least one receiving device. The sending device may be a quantum sending device having a secure quantum communications function. The receiving device may be a quantum receiving device having a secure quantum communications function.

Figure 2:
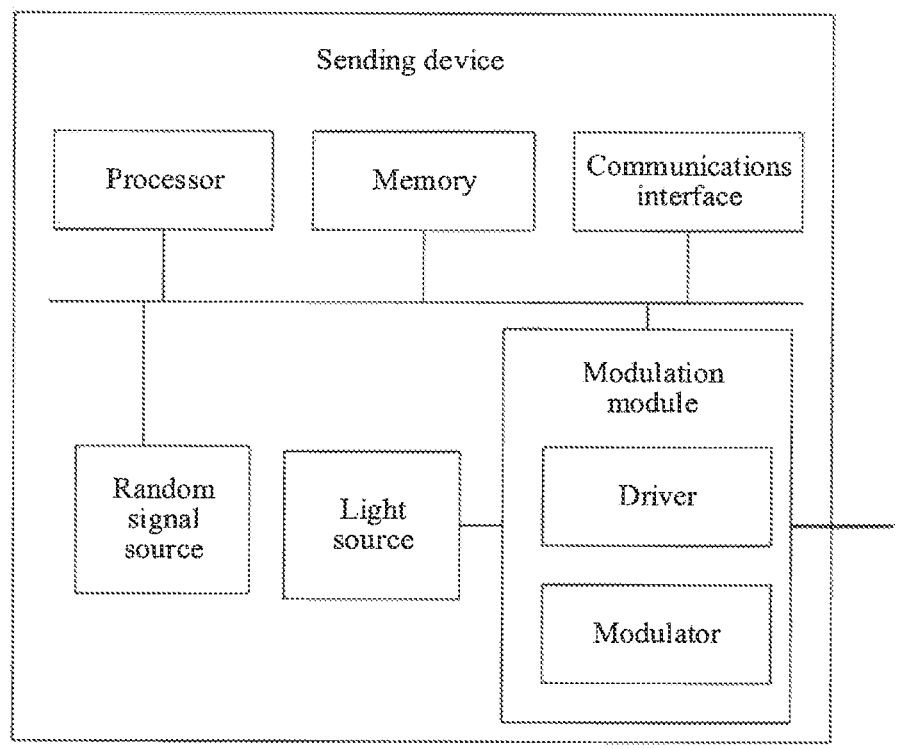
FIG. 2 is a schematic structural diagram 1 of a sending device according to this application.

For example, FIG. 2 is a schematic structural diagram of a sending device according to this application. The sending device may include a light source, a processor, a memory, a modulation module, a random signal source, and the like.

The processor is configured to: decrypt a received command, perform calculation or data processing according to the decrypted command, and send processed data to another device to control the another device to perform a corresponding operation. The processor may be a central processing unit (CPU), a general-purpose processor, a digital signal processor (DSP), an application-specific integrated circuit (ASIC), a field programmable gate array (FPGA) or another programmable logic device, a transistor logic device, a hardware component, or a combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The memory includes a program module, a data module, and the like. The program module may include software, firmware, hardware, or at least two thereof, and is configured to store an application program and an operating system. The memory may include a volatile memory such as a random access memory (RAM), or may include a non-volatile memory such as a flash memory, a hard disk drive (HDD), or a solid-state drive (SSD). The memory may alternatively include a combination of the foregoing types of memories.

The light source is configured to generate a laser signal. The modulation module may modulate, under control of the processor, the laser signal by using random data generated by the random signal source, to obtain a laser signal loaded with the random data, and send the laser signal. The modulation module may include an intensity modulator, a phase modulator, and a driver, and may further include components such as a polarization beam splitter, a beam splitter, a circulator, a 90° polarization rotator, a delayer, a quadrature phase shift keying (QPSK) modulator, and a dual polarization quadrature phase shift keying modulator.

In addition, the sending device provided in this application may further include a communications interface, configured to perform data communication with another network element device in a system under control of the processor.

Figure 3:
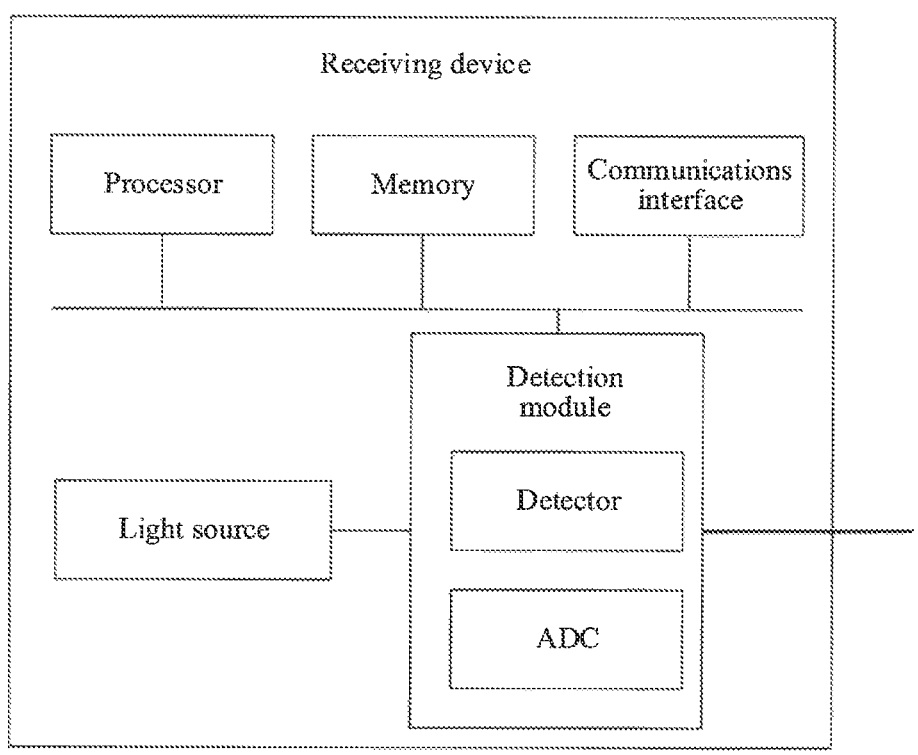
FIG. 3 is a schematic structural diagram 1 of a receiving device according to this application.

FIG. 3 is a schematic structural diagram of a receiving device according to this application. The receiving device may include a processor, a memory, a detection module, a locally local oscillator light source, and the like.

The processor is configured to: decrypt a received command, perform calculation or data processing according to the decrypted command, and send processed data to another device to control the another device to perform a corresponding operation. The processor may be a CPU, a general-purpose processor, a DSP, an ASIC, an FPGA or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The memory includes a program module, a data module, and the like. The program module may include software, firmware, hardware, or at least two thereof, and is configured to store an application program and an operating system. The memory may include a volatile memory such as a RAM, or may include a non-volatile memory such as a flash memory, an HHD, or an SSD. The memory may alternatively include a combination of the foregoing types of memories.

The locally local oscillator light source is configured to generate a local oscillator light. The detection module is configured to: receive a laser signal, and perform coherent detection on the received laser signal by using the local oscillator light, to obtain detection data. The detection module may include components such as a heterodyne detector (HD), a balanced homodyne detector (BHD), and an analog-to-digital converter (ADC).

In addition, the receiving device provided in this application may further include a communications interface, configured to perform data communication with another network element device in a system under control of the processor.

Figure 4:
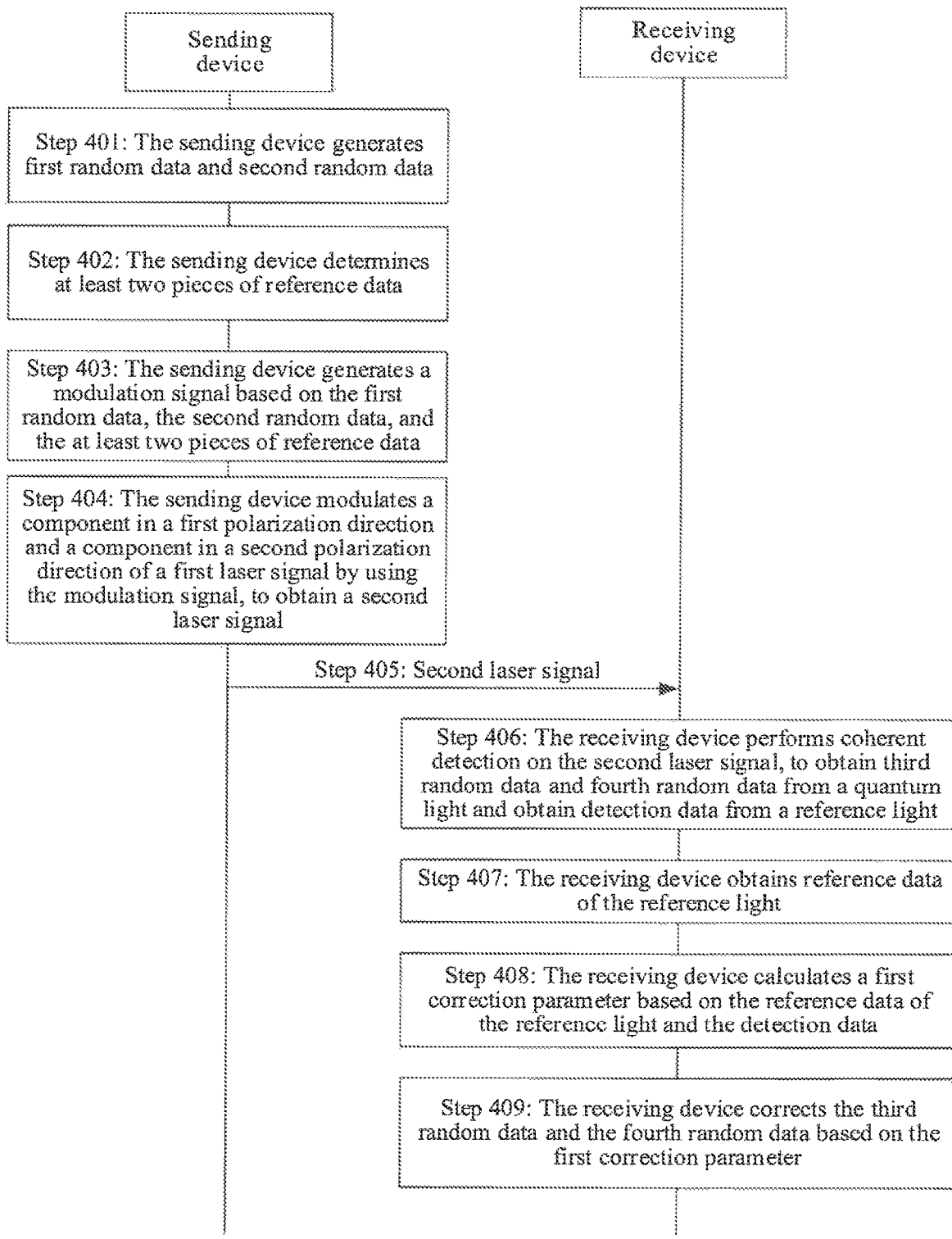
FIG. 4 is a flowchart 1 of an embodiment of a data transmission method according to this application.

Based on FIG. 1, FIG. 4 is a flowchart of an embodiment of a data transmission method according to this application. The method includes the following steps.

Step 401: A sending device generates first random data and second random data.

In this application, the sending device may generate, according to a preset modulation protocol, the first random data and the second random data that are independent of each other. The modulation protocol may be a quadrature phase shift keying (QPSK) modulation protocol, a dual polarization quadrature phase shift keying (DPQPSK) modulation protocol, a Gaussian modulation protocol, or the like.

In an example, the sending device may generate the first random data and the second random data by using two independent random signal sources, for example, a true random number generator (TRNG) and a quantum random number generator (QRNG).

For example, when the preset modulation protocol is the Gaussian modulation protocol, the sending device may use a discrete Gaussian random number generated by a TRNG 1 as the first random data, and use a discrete Gaussian random number generated by a TRNG 2 as the second random data.

Step 402: The sending device determines at least two pieces of reference data.

In this application, any two of the at least two pieces of reference data need to meet the following condition:

One piece of reference data $(X_1, X_2, Y_1, Y_2)^T$ is different from the other piece of reference data $(X_3, X_4, Y_3, Y_4)^T$ in the any two pieces of reference data, and a matrix $$\begin{pmatrix} X_1 & X_2 & Y_1 & Y_2 \\ X_2 & -X_1 & Y_2 & -Y_1 \\ X_3 & X_4 & Y_3 & Y_4 \\ X_4 & -X_3 & Y_4 & -Y_3 \end{pmatrix}$$

constituted by $(X_1, X_2, Y_1, Y_2)^T$ and $(X_3, X_4, Y_3, Y_4)^T$ is a full-rank matrix.

It should be noted that, in this application, one piece of reference data may include two sequences, which are separately used to modulate components of one laser signal in different polarization directions. For example, reference data $(X_1, X_2, Y_1, Y_2)^T$ includes a sequence $(X_1, X_2)$ and a sequence $(Y_1, Y_2)$. The sequence $(X_1, X_2)$ is used to modulate a regular component (including an x component and a p component) of the laser signal in a first polarization direction, and the sequence $(Y_1, Y_2)$ is used to modulate a regular component of the laser signal in a second polarization direction.

Step 403: The sending device generates a modulation signal based on the first random data, the second random data, and the at least two pieces of reference data.

Step 404: The sending device modulates a component in a first polarization direction and a component in a second polarization direction of a first laser signal by using the modulation signal, to obtain a second laser signal.

In this application, when the sending device needs to send the first random data and the second random data, the sending device may generate the first laser signal by using a light source. The first laser signal may be a continuous laser light or a pulse laser light. The following uses the pulse laser light as an example for description.

For example, the light source in the sending device may include a laser and a pulse generation module. The laser generates a continuous wave (CW), and then the pulse generation module converts the continuous wave into a light pulse through wave chopping, to obtain the first laser signal. The continuous wave may be a continuous wave with a linear polarization and a narrow linewidth. The light pulse obtained through wave chopping may be a light pulse with a high extinction ratio.

In an example, a duty cycle of the light pulse in the first laser signal may be from 1% to 99%. For example, a system repetition frequency of 100 MHz is used as an example. If the sending device generates a light pulse at a duty cycle of 50%, the sending device may generate, through wave chopping, a linearly polarized light pulse whose envelope is 5 ns wide square wave.

After generating the first laser signal, the sending device may modulate the first laser signal, to load, to the first laser signal, the first random data and the second random data that need to be sent, and the at least two pieces of reference data that are used by a receiving device to analyze a channel feature change status, so as to obtain the second laser signal.

In this application, a light pulse loaded with the first random data and the second random data in the second laser signal is referred to as a quantum light, and the sending device transmits the first random data and the second random data by using the quantum light. A light pulse loaded with any one of the at least two pieces of reference data in the second laser signal is referred to as a reference light, and the receiving device may analyze a channel feature change status (for example, a status such as an unstable delay, a phase deviation, or polarization direction rotation) by using the reference light, to calculate a correction parameter, and correct the obtained random data.

It should be noted that, each time the receiving device analyzes a channel feature change status of a group of quantum lights (including at least one quantum light), the receiving device needs to detect and analyze at least two groups of reference lights (each group of reference lights may include at least one reference light). Therefore, in this application, each group of quantum lights and two groups of reference lights in the second laser signal constitute a calculation period. The group of quantum lights is loaded with the first random data in the first polarization direction, and is loaded with the second random data in the second polarization direction. Reference lights in a first group of reference lights in the two groups of reference lights are loaded with same reference data, and reference lights in a second group of reference lights are loaded with same reference data. The first group of reference lights is loaded with $X_1$ on an x component in the first polarization direction, the first group of reference lights is loaded with $X_2$ on a p component in the first polarization direction, the first group of reference lights is loaded with $Y_1$ on an x component in the second polarization direction, and the first group of reference lights is loaded with $Y_2$ on a p component in the second polarization direction. The second group of reference lights in the two groups of reference lights is loaded with $X_3$ on the x component in the first polarization direction, the second group of reference lights is loaded with $X_4$ on the p component in the first polarization direction, the second group of reference lights is loaded with $Y_3$ on the x component in the second polarization direction, and the second group of reference lights is loaded with $Y_4$ on the p component in the second polarization direction.

For example, modulation on the quantum light in the first polarization direction is used as an example. It is assumed that the first random data includes a plurality of pairs of data, and one pair of data thereof is $a_1$ (on the x component) and $a_2$ (on the p component). In other words, the data $a_1$ and the data $a_2$ are a pair of random data obtained according to the modulation standard of the preset modulation protocol. For example, for the Gaussian modulation protocol, $a_1$ and $a_2$ are Gaussian random numbers subject to a variance and a mean. For the QPSK modulation protocol, $a_1$ and $a_2$ are specific values subject to two-point distribution.

It is assumed that, when the quantum light is obtained through modulation, a generated coherent state in the first polarization direction is $|\alpha\rangle$, where $\alpha=f_1(a_1)+if_2(a_2)$, $f_1$ represents function transformation performed when $a_1$ is loaded to the quantum light on the x component in the first polarization direction, and $f_2$ represents function transformation performed when $a_2$ is loaded to the quantum light on the p component in the first polarization direction. In an example, $f_1(a_1)=a_1$, and $f_2(a_2)=a_2$. If $\mu$ represents an average quantity of photons in the coherent state, $\mu=|\alpha|^2=a_1^2+a_2^2$.

In this case, in this application, the quantum light is loaded with the first random data in the first polarization direction. To be specific, the x component of the quantum light obtained through modulation in the first polarization direction is $f_1(a_1)$ and the p component of the quantum light in the first polarization direction is $f_2(a_2)$.

Likewise, modulation on the reference light in the first polarization direction is used as an example. If reference data includes $X_1$ (on the x component) and $X_2$ (on the p component), and it is assumed that, when the reference light is obtained through modulation, a generated coherent state in the first polarization direction is $|\beta\rangle$, $\beta=f_3(X_1)+if_4(X_2)$, where $f_3$ represents function transformation performed when $X_1$ is loaded to the reference light on the x component in the first polarization direction, and $f_4$ represents function transformation performed when $X_2$ is loaded to the reference light on the p component in the first polarization direction. In an example, $f_3(X_1)=X_1$, and $f_4(X_2)=X_2$. If $\nu$ represents an average quantity of photons in the coherent state, $\nu=|\beta|^2=X_1^2+X_2^2$. The reference data $X_1$ and the reference data $X_2$ are random numbers determined according to the modulation standard of the protocol. For example, for the Gaussian modulation protocol, $X_1$ (and $X_2$) are Gaussian random numbers subject to a variance and a mean. For the QPSK modulation protocol, $X_1$ (and $X_2$) are specific values subject to two-point distribution.

It may be understood that, in this application, the reference light is loaded with $X_1$ on the x component in the first polarization direction. In other words, the x component of the reference light obtained through modulation in the first polarization direction is $f_3(X_1)$. The first group of reference lights is loaded with $X_2$ on the p component in the first polarization direction. In other words, the p component of the reference light obtained through modulation in the first polarization direction is $f_4(X_2)$.

It should be noted that the first random data and the second random data are generated by the sending device by using a random data source, and the at least two pieces of reference data are obtained by the sending device from a memory of the sending device, or are generated by using a reference data output module. In a process of modulating the first laser signal, the first random data, the second random data, and the at least two pieces of reference data are loaded to the first laser signal through permutation and combination. Therefore, before modulating the first laser signal, the sending device may first permute and combine the first random data, the second random data, and the at least two pieces of reference data according to a preset combination mode by using a data combiner, to obtain a data sequence corresponding to a permutation sequence of the quantum light and the reference light. In addition, when modulating the first laser signal by using a modulator, the sending device uses a signal of another type, for example, a voltage signal. Therefore, the sending device may further convert the data sequence into a corresponding voltage signal by using a data converter, to obtain a finally used modulation signal.

In an example, the sending device may first determine, based on a channel feature, a mode of combination between a signal used to generate a quantum light (referred to as a quantum signal for short below) and a signal used to generate a reference light (referred to as a reference signal for short below), and then permute and combine the first random data, the second random data, and the at least two pieces of reference data according to the combination mode, to generate the modulation signal. A mode of combination between a quantum signal and a reference signal determines the mode of combination between the quantum light and the reference light in the second laser signal obtained by performing modulation by using the modulation signal.

For example, if a channel feature for transmitting the second laser signal changes very slowly, or a system working repetition frequency is very high, the second laser signal obtained by performing modulation by using the modulation signal may include one group of quantum lights and two reference lights in one calculation period. The two reference lights may be respectively located at two ends of the group of quantum lights, or may be mixed among the group of quantum lights. If the channel feature changes relatively fast, the second laser signal obtained by performing modulation by using the modulation signal may include more reference lights, in other words, may include one group of quantum lights and two groups of reference lights in one calculation period. If the channel feature changes very fast, the second laser signal may include one quantum light and two groups of reference lights respectively located at two ends of the quantum light in one calculation period.

In an example, the mode of combination between the quantum signal and the reference signal may be a time division mode or a frequency division mode. The time division mode includes a quantity of quantum signals, a quantity of reference signals, and a time-domain distribution manner of the quantum signal and the reference signal. The frequency division mode includes a quantity of quantum signals, a quantity of reference signals, and a frequency-domain distribution manner of the quantum signal and the reference signal.

It may be understood that, by using a modulation signal generated according to the time division mode, the quantum light and the reference light in the second laser signal obtained through modulation are also obtained through splitting according to the time division mode. A quantity of quantum lights and a quantity of reference lights in the second laser signal are respectively the same as a quantity of quantum signals and a quantity of reference signals, and a time-domain distribution manner of the quantum light and the reference light is the same as a time-domain distribution manner of the quantum signal and the reference signal.

For example, a pulse light is used as an example. The time division mode means that light pulses at different delay locations represent lights of different types (the quantum light or the reference light). For example, as shown in FIG.

5A, the second laser signal includes nine light pulses, light pulses 1, 3, 4, 6, 7, and 9 are reference lights, and light pulses 2, 5, and 8 are quantum lights. Reference lights 1 and 3 are used to analyze a channel feature change status of a quantum light 2. Reference lights 4 and 6 are used to analyze a channel feature change status of a quantum light 5. Reference lights 7 and 9 are used to analyze a channel feature change status of a quantum light 8.

Likewise, by using a modulation signal generated according to the frequency division mode, the quantum light and the reference light in the second laser signal obtained through modulation are also obtained through splitting according to the frequency division mode. A quantity of quantum lights and a quantity of reference lights in the second laser signal are respectively the same as a quantity of quantum signals and a quantity of reference signals, and a frequency-domain distribution manner of the quantum light and the reference light is the same as a frequency-domain distribution manner of the quantum signal and the reference signal. In other words, according to the frequency division mode, the quantum light and the reference light in the obtained second laser signal may have different frequencies, but may overlap in time. For example, as shown in FIG. 5B, one light pulse in the second laser signal includes a reference light at a frequency 1 and a reference light at a frequency 2, and is a quantum light at a frequency 3. The two reference lights in the light pulse are used to analyze a channel feature change status of the quantum light in the light pulse.

In this application, the sending device may generate one modulation signal, to modulate the two polarization directions of the first laser signal. Alternatively, the sending device may generate two modulation signals to respectively modulate the two polarization directions of the first laser signal.

The sending device may directly perform dual polarization modulation on the first laser signal. Alternatively, before performing dual polarization modulation on the first laser signal, the sending device may first perform beam splitting on the first laser signal in the first polarization direction and the second polarization direction, to obtain a component light in the first polarization direction and a component light in the second polarization direction. Then, the sending device separately modulates a first polarized light and a second polarized light. Finally, the sending device performs beam combination on a modulated first polarized light and a modulated second polarized light to obtain a laser light, so as to obtain the second laser signal.

In this application, the sending device may perform beam splitting on the first laser signal by using a polarization beam splitter or a beam splitter.

The following describes, with reference to the following three examples, a case in which the sending device modulates the component in the first polarization direction and the component in the second polarization direction of the first laser signal by using the modulation signal.

Figure 6A:
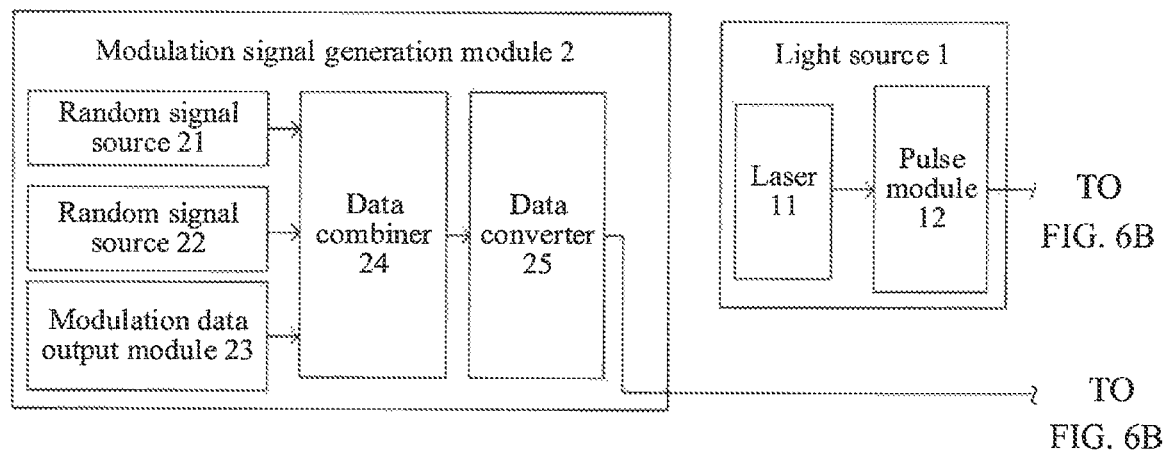
FIGS. 6A and 6B are schematic structural diagrams 2 of a sending device according to this application.
Figure 6B:
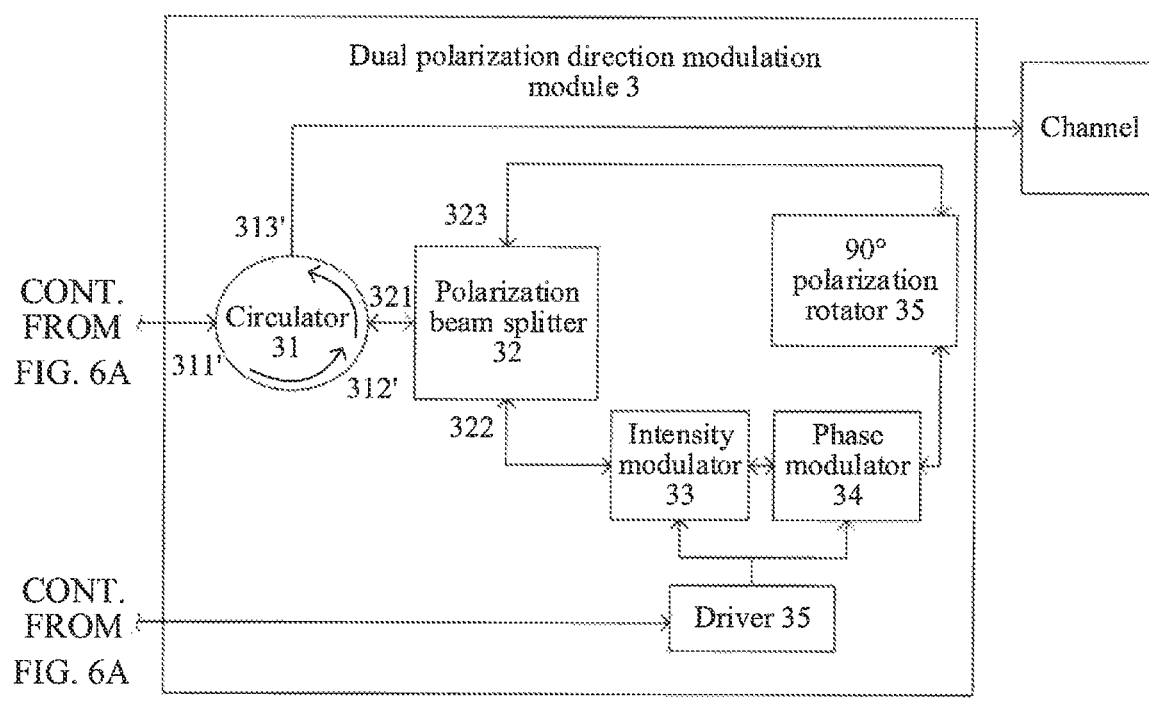

When the sending device generates one modulation signal according to the time division mode, a structure of the sending device may be shown in FIGS. 6A and 6B, including a light source 1, a modulation signal generation module 2, and a dual polarization direction modulation module 3.

The light source 1 includes a laser 11 and a pulse module 12. The laser 11 generates a continuous wave, and then the pulse module 12 converts the continuous wave into a light pulse, to obtain the first laser signal.

The modulation signal generation module 2 may include a random signal source 21, a random signal source 22, a reference data output module 23, a data combiner 24, and a data converter 25. The random signal source 21 generates and outputs the first random data, the random signal source 22 generates and outputs the second random data, and the reference data output module 23 outputs the at least two pieces of reference data. The data combiner 24 permutes and combines, according to the time division mode determined by the sending device, the first random data, the second random data, and the at least two pieces of reference data that are input, to obtain a data sequence. After obtaining the data sequence, the data combiner 24 may output the data sequence to the data converter 25, and the data converter 25 converts the data sequence into a modulation signal.

Example 1

Figure 5A:
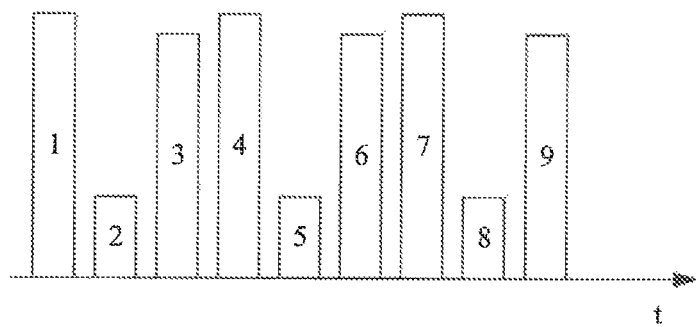
FIG. 5A is a schematic diagram of a light pulse in a time division mode according to this application.
Figure 5B:
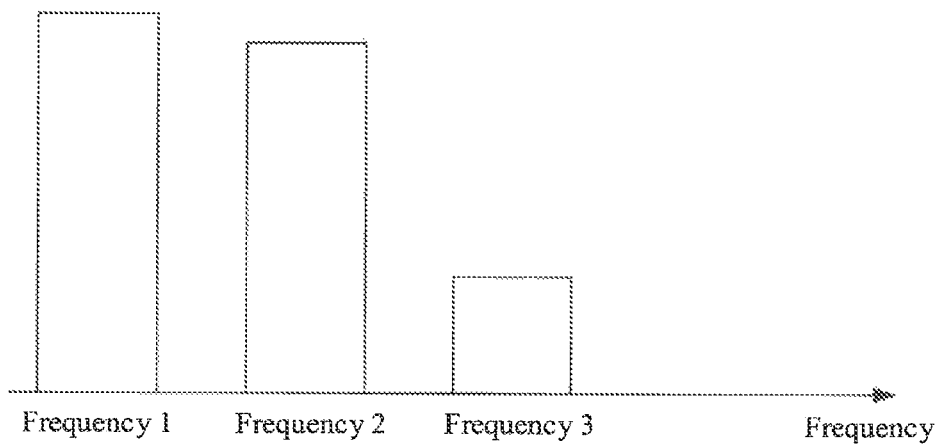
FIG. 5B is a schematic diagram of a light pulse in a frequency division mode according to this application.

With reference to FIG. 5A, it is assumed that the first random data of the random signal source 21 includes three pairs of data: $\{(a_1, a_2), (a_3, a_4), (a_5, a_6)\}$, and the second random data of the random signal source 22 includes three pairs of data: $\{(b_1, b_2), (b_3, b_4), (b_5, b_6),\}$. The two pieces of reference data that are output by the reference data output module 23 are $(X_1, X_2, Y_1, Y_2)^T$ and $(X_3, X_4, Y_3, Y_4)^T$. A preset time division mode is as follows: There are six reference signals and three quantum signals in each polarization direction. In a time sequence of light pulses, a time-domain distribution status is that each signal used to modulate the component in the first polarization direction is permuted before each signal used to modulate the component in the second polarization direction. The six reference signals and the three quantum signals that are corresponding to each polarization direction are grouped in a unit of two reference signals and one quantum signal, to obtain three groups of signals for sequential permutation, and signals in each group are permutated in a sequence of "reference signal, quantum signal, and reference signal".

In this case, the data combiner 24 first permutes the first random data, the second random data, and the two pieces of reference data according to the preset time division mode, to obtain a data sequence $\{(X_1, X_2), (a_1, a_2), (X_3, X_4), (X_1, X_2), (a_3, a_4), (X_3, X_4), (X_1, X_2), (a_5, a_6), (X_3, X_4), (Y_1, Y_2), (b_1, b_2), (Y_3, Y_4), (Y_1, Y_2), (b_3, b_4), (Y_3, Y_4), (Y_1, Y_2), (b_5, b_6), (Y_3, Y_4)\}$, where $\{(X_1, X_2), (a_1, a_2), (X_3, X_4), (X_1, X_2), (a_3, a_4), (X_3, X_4), (X_1, X_2), (a_5, a_6), (X_3, X_4)\}$ is a data sub-sequence 1 corresponding to the first polarization direction, and $\{(Y_1, Y_2), (b_1, b_2), (Y_3, Y_4), (Y_1, Y_2), (b_3, b_4), (Y_3, Y_4), (Y_1, Y_2), (b_5, b_6), (Y_3, Y_4)\}$ is a data sub-sequence 2 corresponding to the second polarization direction. After the data combiner 24 sends the data sequence to the data converter 25, the data converter 25 may convert the data sequence into a corresponding voltage sequence, to obtain the modulation signal.

The dual polarization direction modulation module 3 may include a circulator 31, a polarization beam splitter 32, an intensity modulator 33, a phase modulator 34, a driver 35, and a 90° polarization rotator 35. After entering the circulator 31 from an end 311' of the circulator 31, the first laser signal output by the pulse module 12 is output from an end 312' of the circulator, and enters the polarization beam splitter 32 from an end 321 of the polarization beam splitter 32. The polarization beam splitter 32 splits the first laser signal into the component light in the first polarization direction (referred to as the first polarized light for short below) and the component light in the second polarization direction (referred to as the second polarized light for short below).

The first polarized light is output from an end 322 of the polarization beam splitter 32, and is transmitted along a polarization maintaining optical fiber in a counterclockwise direction shown in FIGS. 6A and 6B. When the first polarized light arrives at the intensity modulator 33 and the phase modulator 34, the driver 35 drives the intensity modulator 33 and the phase modulator 34 based on the modulation signal, so that the intensity modulator 33 and the phase modulator 34 modulate, based on the voltage sequence in the modulation signal, the first polarized light that arrives, to load the data sub-sequence 1 to the first polarized light. After being modulated by the intensity modulator 33 and the phase modulator 34, the first polarized light is rotated by the 90° polarization rotator 35 by 90°, continues to be transmitted along the polarization maintaining optical fiber, and enters the polarization beam splitter 32 from an end 323 of the polarization beam splitter 32.

The second polarized light is output from the end 323 of the polarization beam splitter 32, and is transmitted along the polarization maintaining optical fiber in a clockwise direction shown in FIGS. 6A and 6B. First, the second polarized light is rotated by the 90° polarization rotator 35 by 90°, so that polarization directions of the first polarized light and the second polarized light are perpendicular to each other. Then, the second polarized light arrives at the phase modulator 34 and the intensity modulator 33, and is modulated by the phase modulator 34 and the intensity modulator 33, to load the data sub-sequence 2 to the second polarized light. After being modulated by the intensity modulator 34 and the phase modulator 33, the second polarized light continues to be transmitted along the polarization maintaining optical fiber, and enters the polarization beam splitter 32 from the end 322 of the polarization beam splitter 32.

It can be learned from the foregoing example 1 that, after the dual polarization direction modulation module 3 modulates the nine light pulses in the first laser signal by using the foregoing modulation signal, the second laser signal shown in FIG. 5A may be obtained. Light pulses 1, 4, and 7 are loaded with $X_1$ on the x component in the first polarization direction, are loaded with $X_2$ on the p component in the first polarization direction, are loaded with $Y_1$ on the x component in the second polarization direction, and are loaded with $Y_2$ on the p component in the second polarization direction. Light pulses 3, 6, and 9 are loaded with $X_3$ on the x component in the first polarization direction, are loaded with $X_4$ on the p component in the first polarization direction, are loaded with $Y_3$ on the x component in the second polarization direction, and are loaded with $Y_4$ on the p component in the second polarization direction. The light pulse 2 is loaded with $a_1$ on the x component in the first polarization direction, is loaded with $a_2$ on the p component in the first polarization direction, is loaded with $b_1$ on the x component in the second polarization direction, and is loaded with $b_2$ on the p component in the second polarization direction. The light pulse 5 is loaded with $a_3$ on the x component in the first polarization direction, is loaded with $a_4$ on the p component in the first polarization direction, is loaded with $b_3$ on the x component in the second polarization direction, and is loaded with $b_4$ on the p component in the second polarization direction. The light pulse 8 is loaded with $a_5$ on the x component in the first polarization direction, is loaded with $a_6$ on the p component in the first polarization direction, is loaded with $b_5$ on the x component in the second polarization direction, and is loaded with $b_6$ on the p component in the second polarization direction.

It should be noted that a moment at which the first polarized light arrives at the phase modulator 34 and the intensity modulator 33 is different from a moment at which the second polarized light arrives at the phase modulator 34 and the intensity modulator 33. In other words, the phase modulator 34 and the intensity modulator 33 separately modulate the first polarized light and the second polarized light in time domain. Therefore, independent data can be modulated in the two polarization directions by using one group of modulators.

Because the first polarized light and the second polarized light are simultaneously output from the end 323 and the end 322 of the polarization beam splitter 32, and pass through a same path, the first polarized light and the second polarized light may simultaneously return to the polarization beam splitter 32, so that the polarization beam splitter 32 can perform beam combination on the first polarized light and the second polarized light to obtain the second laser signal.

The second laser signal is output from the end 321 of the polarization beam splitter 32, and is input from the end 312' of the circulator 31. Then, the second laser signal is output from the end 323 of the circulator, and is transmitted to the receiving device through a channel.

Figure 6C:
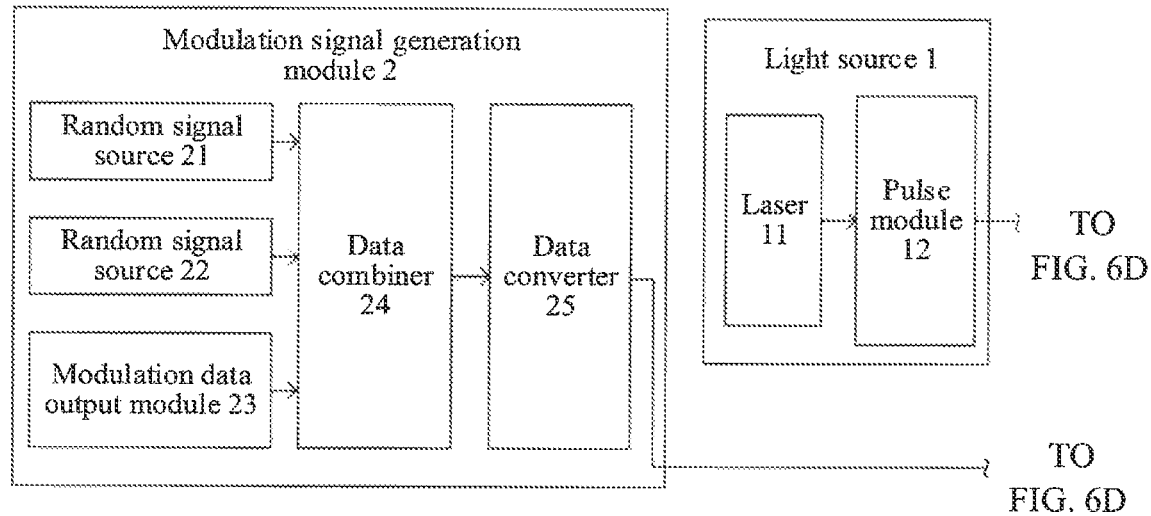
FIGS. 6C and 6D are schematic structural diagrams 3 of a sending device according to this application.
Figure 6D:
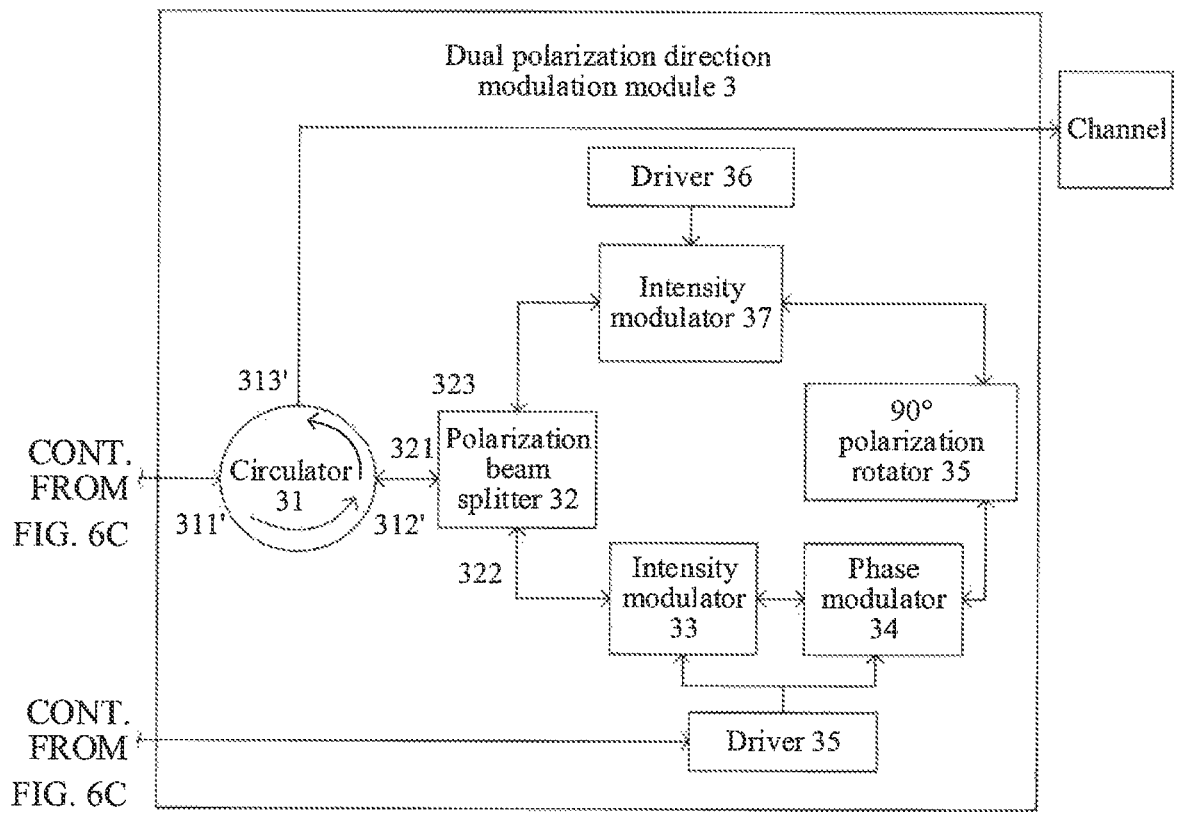

Optionally, with reference to FIGS. 6A and 6B, as shown in FIGS. 6C and 6D, to obtain a reference light (with a relatively strong light intensity) and a quantum light (with a relatively weak light intensity) of different intensities, a driver 36 and an intensity modulator 37 may be added between the end 323 of the polarization beam splitter 32 and the 90° polarization rotator 35. In this case, the driver 36 may drive the intensity modulator 37 in a preset intensity proportion, so that the intensity modulator 37 can modulate, in the preset intensity proportion, light intensities of reference lights and light intensities of quantum lights in the first polarized light and the second polarized light that arrive.

Figure 6E:
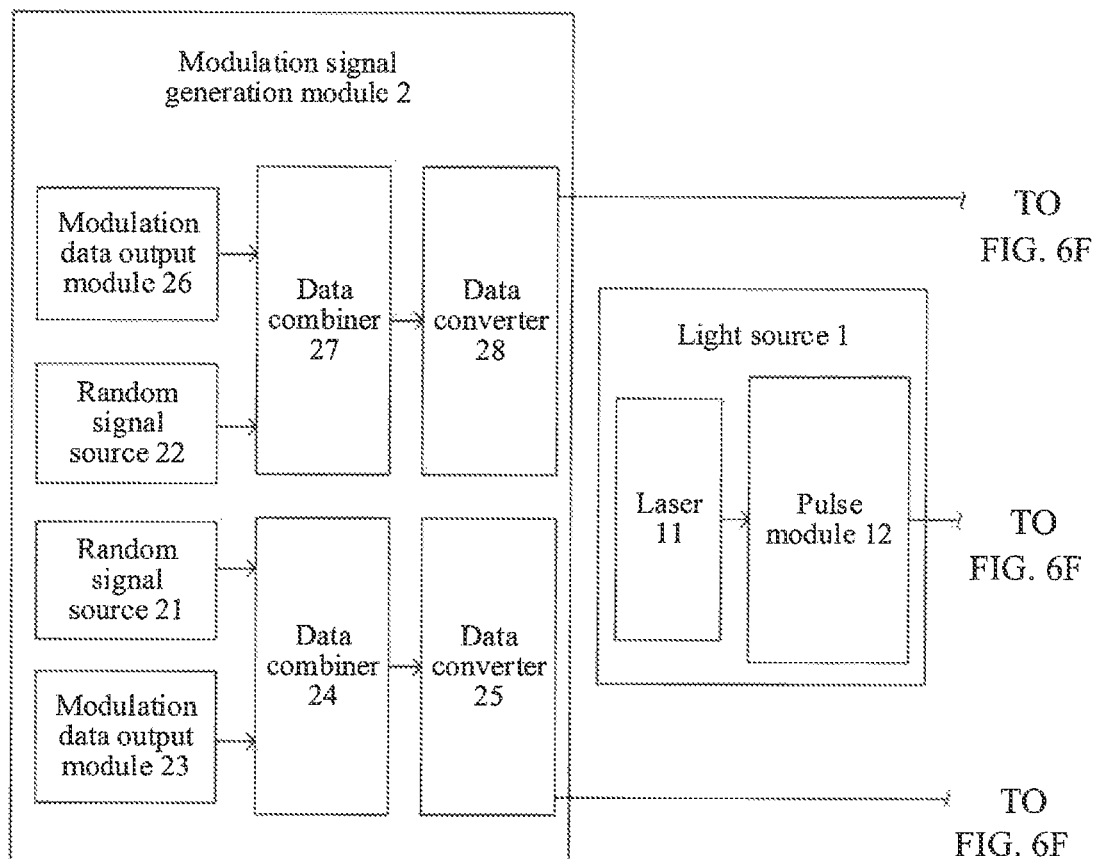
FIGS. 6E and 6F are schematic structural diagrams 4 of a sending device according to this application.
Figure 6F:
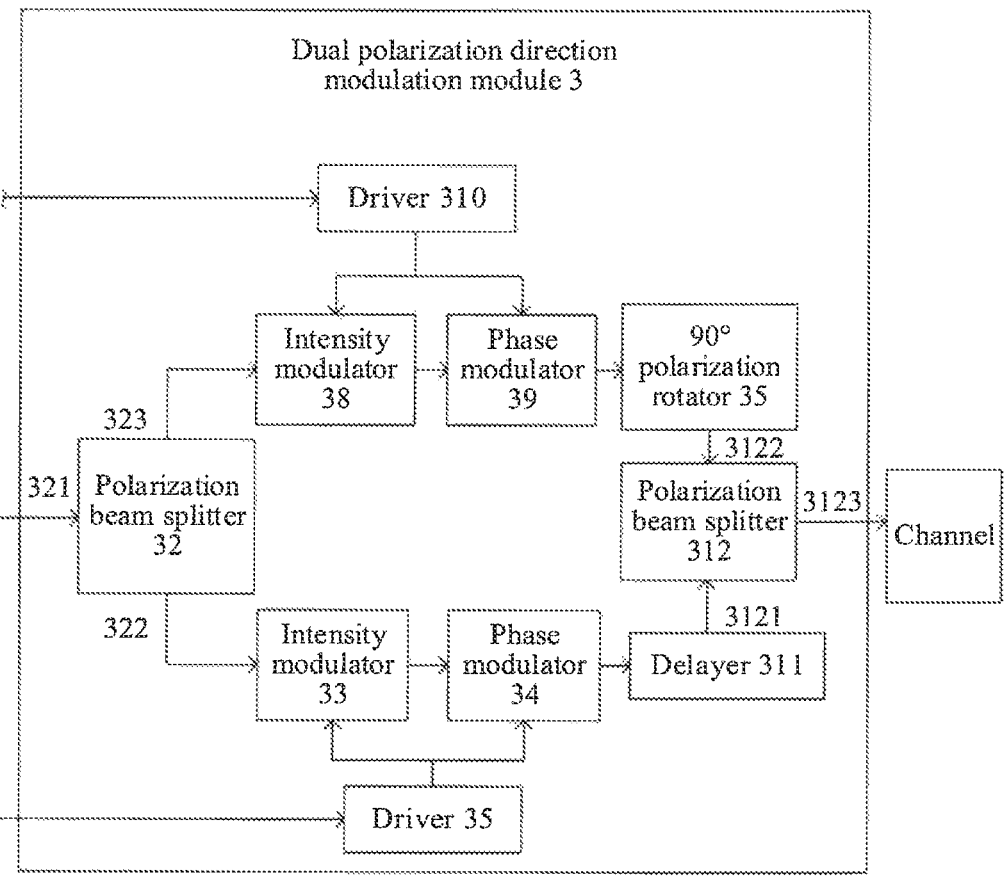

When the sending device generates two modulation signals according to the time division mode, a structure of the sending device may be shown in FIGS. 6E and 6F, including a light source 1, a modulation signal generation module 2, and a modulation module 3.

Compared with the structure of the sending device that is shown in FIGS. 6A and 6B, the modulation signal generation module 2 includes a random signal source 21, a random signal source 22, a reference data output module 23, a reference data output module 26, a data combiner 24, a data combiner 27, a data converter 25, and a data converter 28.

The random signal source 21 generates and outputs the first random data, and the reference data output module 23 outputs a sequence that is in the at least two pieces of reference data and that is used to modulate the component in the first polarization direction. The data combiner 24 permutes, according to the preset time division mode, sequences that are in the first random data and the at least two pieces of reference data and that are used to modulate the component in the first polarization direction, to obtain a data sub-sequence 1. Then, the data converter 25 converts the data sub-sequence 1 into a modulation signal 1.

Likewise, the random signal source 22 generates and outputs the second random data, and the reference data output module 26 outputs a sequence that is in the at least two pieces of reference data and that is used to modulate the component in the second polarization direction. The data combiner 27 also permutes, according to the time division mode, sequences that are in the second random data and the at least two pieces of reference data and that are used to modulate the component in the second polarization direction, to obtain a data sub-sequence 2. Then, the data converter 28 converts the data sub-sequence 2 into a modulation signal 2.

Example 2

With reference to FIG. 5A, it is assumed that the first random data of the random signal source 21 includes three pairs of data: $\{(a_1, a_2), (a_3, a_4), (a_5, a_6)\}$, and the second random data of the random signal source 22 includes three pairs of data: $\{(b_1, b_2), (b_3, b_4), (b_5, b_6),\}$. The reference data output module 23 outputs two sequences $(X_1, X_2)^T$ and $(X_3, X_4)^T$ that are used to modulate the component in the first polarization direction. The reference data output module 26 outputs two sequences $(Y_1, Y_2)^T$ and $(Y_3, Y_4)^T$ that are used to modulate the component in the second polarization direction.

The preset time division mode is as follows: Six reference signals and three quantum signals are included. In a time sequence of light pulses, a time-domain distribution status is that the six reference signals and the three quantum signals are grouped in a unit of two reference signals and one quantum signal, to obtain three groups of signals for sequential permutation, and signals in each group are permutated in a sequence of "reference signal, quantum signal, and reference signal".

In this case, the data combiner 24 first permutes, according to the preset time division mode, the first random data and the two sequences used to modulate the components in the first polarization direction, to obtain the data sub-sequence 1 $\{(X_1, X_2), (a_1, a_2), (X_3, X_4), (X_1, X_2), (a_3, a_4), (X_3, X_4), (X_1, X_2), (a_5, a_6), (X_3, X_4)\}$. Then, the data converter 25 converts the data sub-sequence 1 into a corresponding voltage sequence, to obtain the modulation signal 1.

In this case, the data combiner 27 also first permutes, according to the preset time division mode, the second random data and the two sequences used to modulate the component in the second polarization direction, to obtain the data sub-sequence 2 $\{(Y_1, Y_2), (b_1, b_2), (Y_3, Y_4), (Y_1, Y_2), (b_3, b_4), (Y_3, Y_4), (Y_1, Y_2), (b_5, b_6), (Y_3, Y_4)\}$. Then, the data converter 28 converts the data sub-sequence 2 into a corresponding voltage sequence, to obtain the modulation signal 2.

The dual polarization direction modulation module 3 includes a polarization beam splitter 32, an intensity modulator 33, a phase modulator 34, a driver 35, an intensity modulator 38, a phase modulator 39, a driver 310, a delayer 311, a 90° polarization rotator 35, and a polarization beam splitter 312.

The first laser signal output by the pulse module 12 enters the polarization beam splitter 32 from the end 321 of the polarization beam splitter 32. The polarization beam splitter 32 splits the first laser signal into the first polarized light and the second polarized light. The first polarized light is output from the end 322 of the polarization beam splitter 32, and is transmitted along the polarization maintaining optical fiber. When the first polarized light arrives at the intensity modulator 33 and the phase modulator 34, the driver 35 drives the intensity modulator 33 and the phase modulator 34 based on the modulation signal 1, so that the intensity modulator 33 and the phase modulator 34 modulate, based on the voltage sequence in the modulation signal 1, the first polarized light that arrives, to load the data sub-sequence 1 to the first polarized light. After being modulated by the intensity modulator 33 and the phase modulator 34, the first polarized light arrives at the delayer 311, and the delayer 311 controls a time at which the first polarized light arrives at the polarization beam splitter 312, so that the first polarized light and the second polarized light simultaneously arrive at the polarization beam splitter 312. After arriving at the delayer 311, the first polarized light continues to be transmitted along the polarization maintaining optical fiber, and enters the polarization beam splitter 312 from an end 3121 of the polarization beam splitter 312.

The second polarized light is output from the end 323 of the polarization beam splitter 32, and continues to be transmitted along the polarization maintaining optical fiber. When the second polarized light arrives at the intensity modulator 38 and the phase modulator 39, the driver 310 drives the intensity modulator 38 and the phase modulator 39 based on the modulation signal 2, so that the intensity modulator 38 and the phase modulator 39 modulate, based on the voltage sequence in the modulation signal 2, the second polarized light that arrives, to load the data sub-sequence 2 to the second polarized light. After being modulated by the intensity modulator 38 and the phase modulator 39, the second polarized light is rotated by the 90° polarization rotator 35 by 90°, so that the second polarized light and the first polarized light are perpendicular to each other. After being rotated by the 90° polarization rotator 35, the second polarized light enters the polarization beam splitter 312 from an end 3122 of the polarization beam splitter 312. Then, the polarization beam splitter 312 may perform beam combination on the first polarized light and the second polarized light, to obtain the second laser signal, so that the second laser signal is output to a channel from an end 3123 of the polarization beam splitter 312.

Figure 6G:
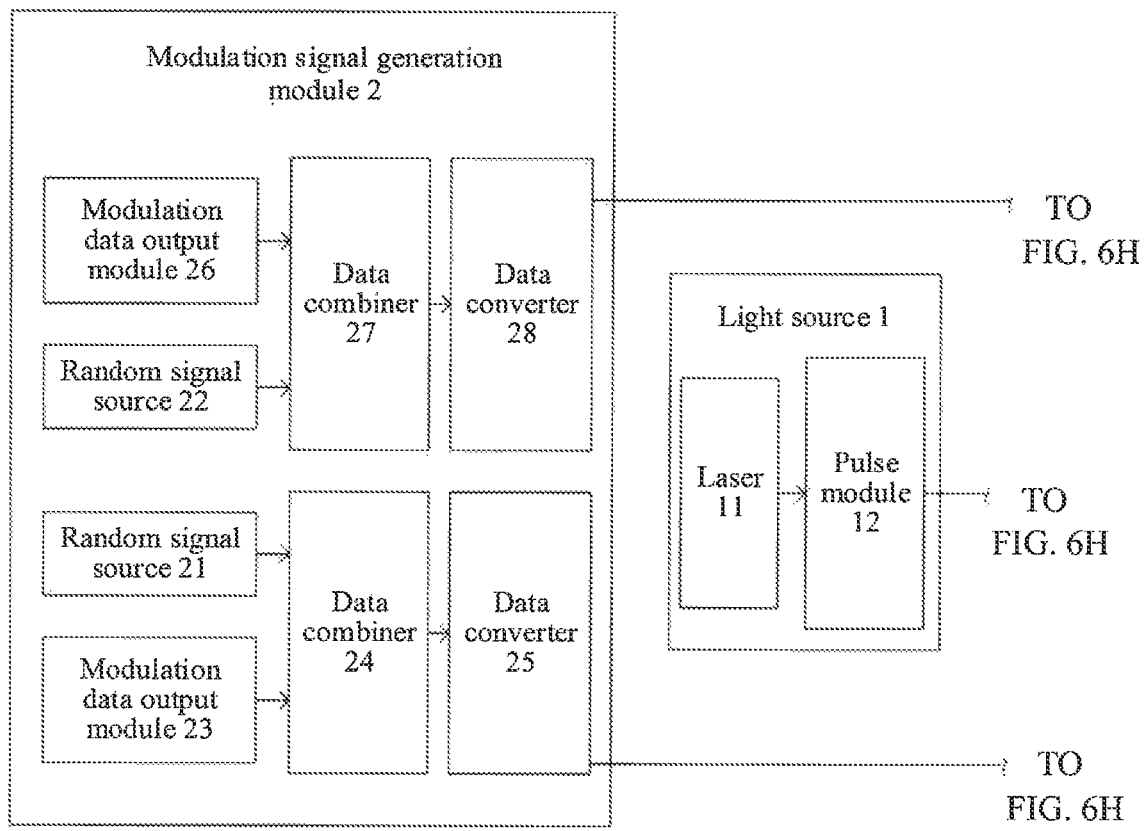
FIGS. 6G and 6H are schematic structural diagrams 5 of a sending device according to this application.
Figure 6H:
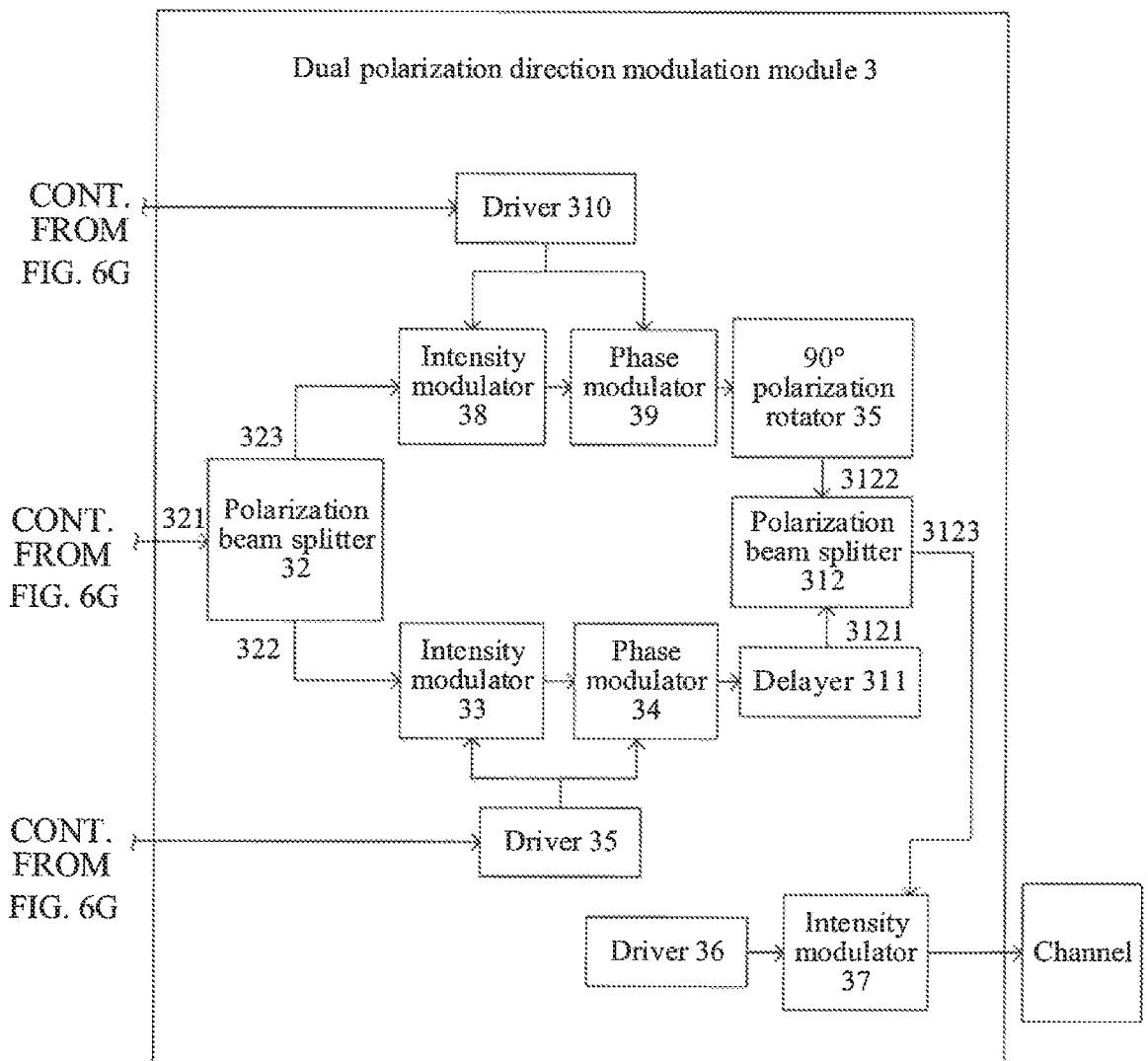

Optionally, with reference to FIGS. 6E and 6F, as shown in FIGS. 6G and 6H, to obtain a reference light and a quantum light of different intensities, a driver 36 and an intensity modulator 37 may be further added at the end 3123 of the polarization beam splitter 312. The driver 36 drives the intensity modulator 37 in a preset intensity proportion, so that the intensity modulator 37 can modulate, in the preset intensity proportion, light intensities of the reference light and the quantum light in the second polarized light that arrives.

Figure 6I:
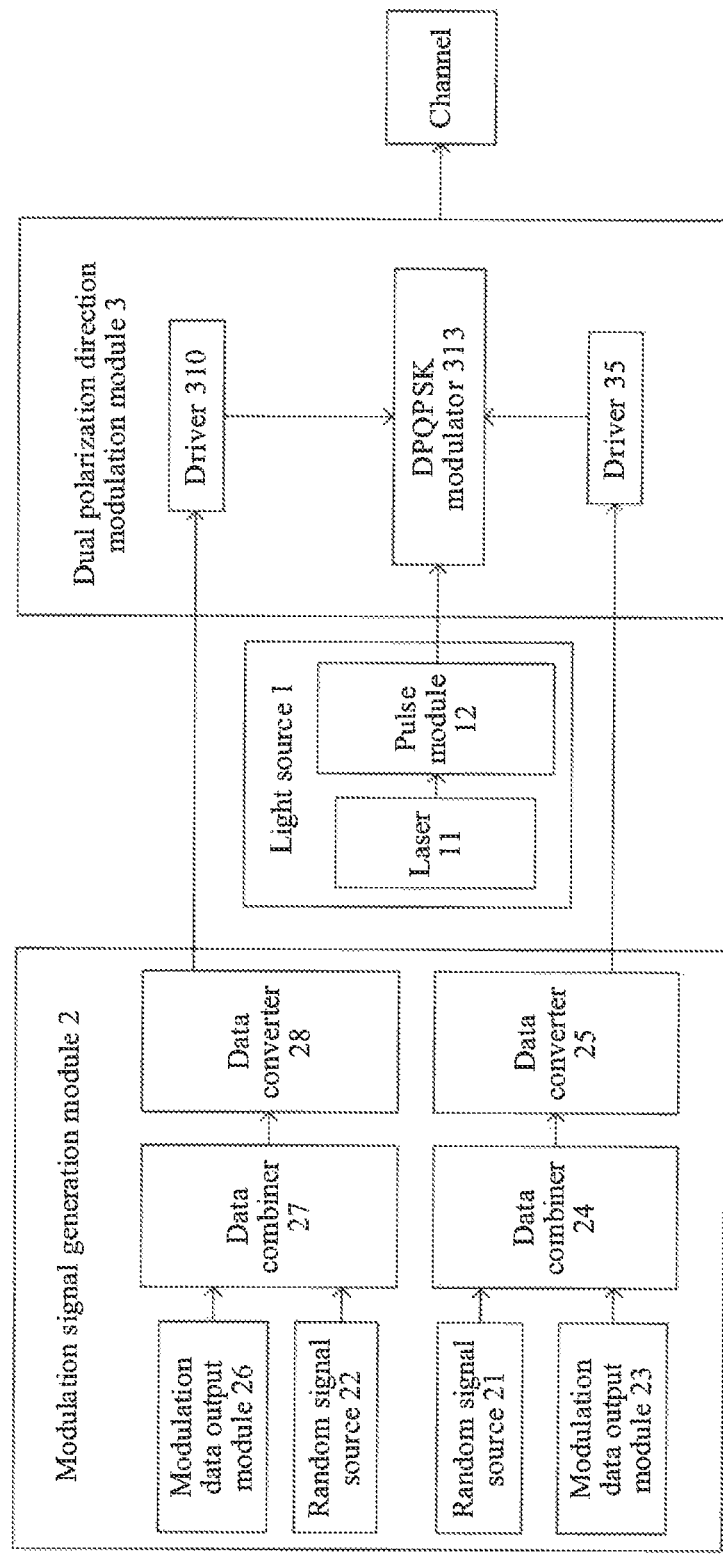
FIG. 6I is a schematic structural diagram 6 of a sending device according to this application.

When the sending device generates two modulation signals according to the frequency division mode, a structure of the sending device may be shown in FIG. 6I, including a light source 1, a modulation signal generation module 2, and a dual polarization direction modulation module 3.

Compared with the structure of the sending device that is shown in FIGS. 6E and 6F, the data combiner 24 in the modulation signal generation module 2 permutes, according to a combination mode in which "two lights with a frequency of $\psi_{r1}, \omega_{r2}$ in one light pulse are reference lights, and a light with a frequency of $\omega_s$ is a quantum light", sequences that are in the first random data and the at least two pieces of reference data and that are used to modulate the component in the first polarization direction, to obtain a data sub-sequence 3. The data converter 25 converts the data sub-sequence 3 into the modulation signal 1. The data combiner 27 also permutes, according to the combination mode in which "two lights with a frequency of $\omega_{r1}, \omega_{r2}$ in one light pulse are reference lights, and a light with a frequency of $\omega_s$ is a quantum light", sequences that are in the second random data and the at least two pieces of reference data and that are used to modulate the component in the second polarization direction, to obtain a data sub-sequence 4. The data converter 28 converts the data sub-sequence 4 into the modulation signal 2.

Example 3

With reference to FIG. 5B, it is assumed that the first random data of the random signal source 21 includes one pair of data: $(a_1, a_2)$, and the second random data of the random signal source 22 includes one pair of data: $(b_1, b_2)$. The reference data output module 23 outputs two sequences $(X_1, X_2)^T$ and $(X_3, X_4)^T$ that are used to modulate the component in the first polarization direction. The reference data output module 26 outputs two sequences $(Y_1, Y_2)^T$ and $(Y_3, Y_4)^T$ that are used to modulate the component in the second polarization direction.

A preset frequency division mode is as follows: Two reference signals and one quantum signal are included. $(\omega_{r1}, \omega_{r2}, \omega_{r3})$ are grouped in frequency of one light pulse, and a frequency-domain distribution status is that permutation is performed in a sequence of "first reference signal, second reference signal, and quantum signal". To be specific, the first reference signal is used to modulate a light with a frequency of $\omega_{r1}$, the second reference signal is used to modulate a light with a frequency of $\omega_{r2}$, and the quantum signal is used to modulate a light with a frequency of $\omega_{r3}$.

In this case, the data combiner 24 first permutes, according to the preset frequency division mode, the first random data and the two sequences used to modulate the component in the first polarization direction, to obtain the data sub-sequence 3 $\{(X_1, X_2), (X_3, X_4), (a_1, a_2)\}$. Then, the data converter 25 converts the data sub-sequence 3 into a corresponding voltage sequence, to obtain a modulation signal 3.

The data combiner 27 also first permutes, according to the preset frequency division mode, the second random data and the two sequences used to modulate the component in the second polarization direction, to obtain the data sub-sequence 4 $\{(Y_1, Y_2), (Y_3, Y_4), (b_1, b_2)\}$. Then, the data converter 28 converts the data sub-sequence 4 into a corresponding voltage sequence, to obtain a modulation signal 4.

The dual polarization direction modulation module 3 includes a driver 35, a driver 310, and a DPQPSK modulator 313. The DPQPSK modulator has two inputs. The driver 35 drives the DPQPSK modulator 313 by using the modulation signal 3, so that the DPQPSK modulator 313 loads the data sub-sequence 3 to the light in the first polarization direction. The driver 310 drives the DPQPSK modulator 313 by using the modulation signal 4, so that the DPQPSK modulator 313 loads the data sub-sequence 4 to the light in the second polarization direction.

It can be learned from the foregoing example 3 that, after the dual polarization direction modulation module 3 modulates the light pulse in the first laser signal by using the modulation signal 3 and the modulation signal 4, the second laser signal shown in FIG. 5B may be obtained. A light with a frequency of $\omega_{r1}$ in a light pulse in the second laser signal is the first reference light, and the first reference light is loaded with $X_1$ on the x component in the first polarization direction, is loaded with $X_2$ on the p component in the first polarization direction, is loaded with $Y_1$ on the x component in the second polarization direction, and is loaded with $Y_2$ on the p component in the first polarization direction. A light with a frequency of $\omega_{r2}$ in the light pulse is the second reference light, and the second reference light is loaded with $X_3$ on the x component in the first polarization direction, is loaded with $X_4$ on the p component in the first polarization direction, is loaded with $Y_3$ on the x component in the second polarization direction, and is loaded with $Y_4$ on the p component in the first polarization direction. A light with a frequency of $\omega_{r3}$ in the light pulse is the quantum light, and the quantum light is loaded with $a_1$ on the x component in the first polarization direction, is loaded with $a_2$ on the p component in the first polarization direction, is loaded with $b_1$ on the x component in the second polarization direction, and is loaded with $b_2$ on the p component in the first polarization direction.

It can be learned that, according to the frequency division mode, each light pulse can transmit two pieces of random data. Therefore, a quantum signal rate reaches two signals/pulse.

Step 405: The sending device sends the second laser signal.

The sending device sends the second laser signal to the receiving device through an optical fiber channel.

Step 406: The receiving device performs coherent detection on the second laser signal, to obtain third random data and fourth random data from the quantum light and obtain detection data from the reference light.

In this application, the receiving device may split the second laser signal into the light in the first polarization direction and the light in the second polarization direction of the second laser signal. Then, the receiving device may separately perform interference on the lights in the two polarization directions of the second laser signal by using a locally local oscillator (LLO), to obtain the third random data, the fourth random data, and the detection data.

Figure 7A:
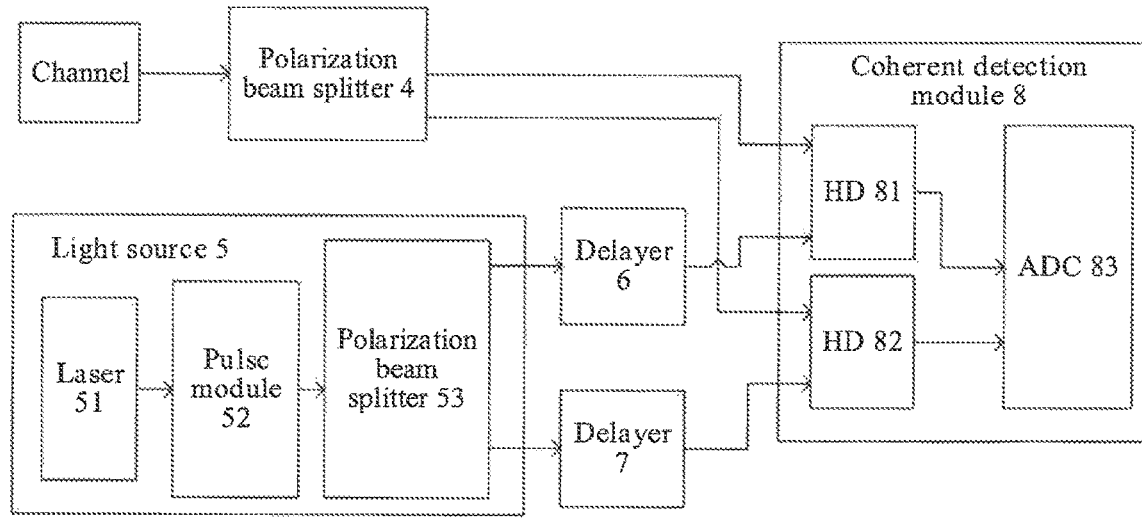
FIG. 7A is a schematic structural diagram 2 of a receiving device according to this application.

For example, FIG. 7A is a possible schematic structural diagram of the receiving device, including a polarization beam splitter 4, a light source 5, a delayer 6, a delayer 7, and a coherent detection module 8.

After receiving the second laser signal from the channel, the receiving device splits the second laser signal into a light in the first polarization direction (referred to as a first polarized light for short below) and a light in the second polarization direction (referred to as a second polarized light for short below) of the second laser signal by using the polarization beam splitter 4.

The light source 5 includes a laser source 51, a pulse module 52, and a beam splitter 53. The laser source 51 generates a continuous wave, and then the pulse module converts the continuous wave into a light pulse, to obtain an LLO. In this example, the beam splitter 53 is a polarization beam splitter, and is configured to split the obtained LLO into LLOs in the two polarization directions (referred to as a first LLO and a second LLO for short below).

It should be noted that the LLO used by the receiving device may be a continuous light or a pulse light. In this example, the pulse light is used as an example for description.

The delayer 6 is configured to decrease a phase difference generated when the first LLO and the first polarized light arrive at the coherent detection module 8, so that the first LLO can interfere with the first polarized light.

The delayer 7 is configured to control the second LLO and the second polarized light to simultaneously arrive at the coherent detection module 8, so that the second LLO can interfere with the second polarized light.

The coherent detection module 8 includes a heterodyne detector (HD) 81, an HD 82, and an analog-to-digital converter (ADC) 83. The HD 81 is connected to the beam splitter 53 and the delayer 6 by using a polarization maintaining optical fiber, and the first LLO and the first polarized light are input to the HD 81 by using the polarization maintaining optical fiber. The polarization maintaining optical fiber can ensure that polarization directions of the first LLO and the first polarized light are not rotated.

After the first LLO and the first polarized light enter the HD 81, the HD 81 controls the first LLO to interfere with the first polarized light, to detect data loaded to the first polarized light. Then, the ADC 83 collects a detection result of the HD 81, and obtains the third random data detected from the quantum light and the detection data detected from the reference light in the first polarization direction.

Likewise, the HD 82 is also connected to the beam splitter 53 and the delayer 7 by using a polarization maintaining optical fiber, and the second LLO and the second polarized light are input to the HD 82 by using the polarization maintaining optical fiber. The HD 82 controls the second LLO to interfere with the second polarized light, to detect data loaded to the second polarized light. Then, the ADC 83 collects a detection result of the HD 82, and obtains the third random data detected from the quantum light and the detection data detected from the reference light in the second polarization direction.

Figure 7B:
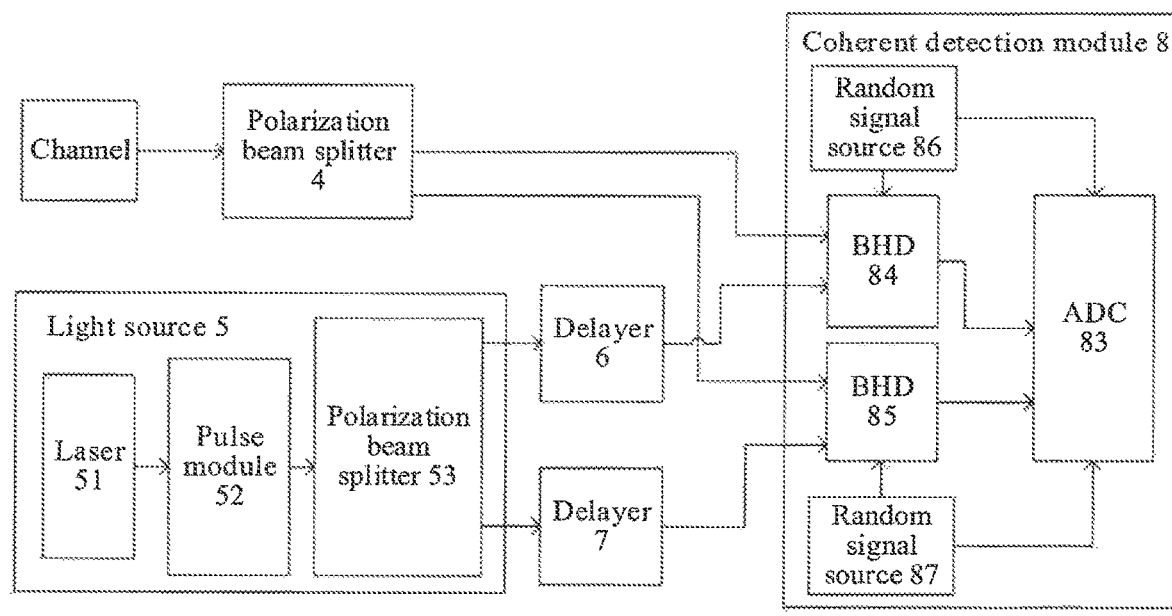
FIG. 7B is a schematic structural diagram 3 of a receiving device according to this application.

Optionally, FIG. 7B is another possible schematic structural diagram of the receiving device. Compared with the structure shown in FIG. 7A, the HD 81 and the HD 82 in the structure shown in FIG. 7A are replaced with a balanced homodyne detector (BHD) 84 and a BHD 85. In addition, a random signal source 86 and a random signal source 87 are added.

Optionally, the receiving device may also first split the second laser signal into a first optical signal and a second optical signal. Then, the receiving device separately performs coherent detection on the first optical signal and the second optical signal in different coherent detection manners. For example, the receiving device performs coherent detection on the first optical signal in a first coherent detection manner (for example, in a detection manner of modulating an intensity of an LLO), to obtain detection data (referred to as a first part of detection data below) from a reference light in the first optical signal and obtain the third random data and the fourth random data from a quantum light in the first optical signal. The receiving device performs coherent detection on the second optical signal in a second coherent detection manner (for example, in a high-bandwidth and low-gain detection manner), and detects only a reference light in the second optical signal, to obtain detection data (referred to as a second part of detection data below) from the reference light in the second optical signal.

Figure 7C:
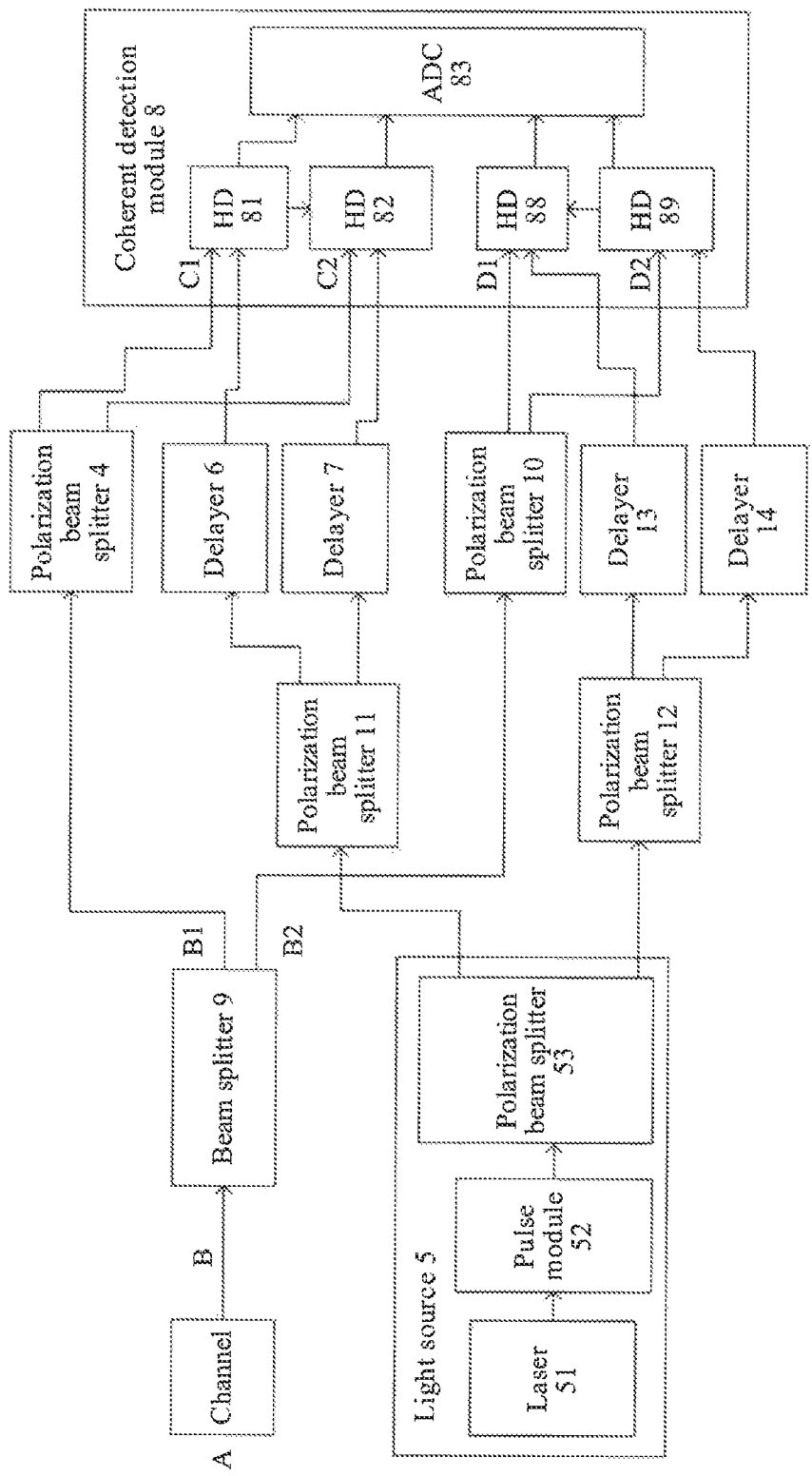
FIG. 7C is a schematic structural diagram 4 of a receiving device according to this application.

For example, a structure of the receiving device may be shown in FIG. 7C, including a beam splitter 9, a polarization beam splitter 4, a polarization beam splitter 10, a polarization beam splitter 11, a polarization beam splitter 12, a light source 5, a delayer 6, a delayer 7, a delayer 13, a delayer 14, and a coherent detection module 8.

The beam splitter 9 may be an unbalanced beam splitter. For example, the beam splitter 9 is a beam splitter with a relatively high transmittance, and can split an input light into a 90% light and a 10% light for outputting. It is assumed that the second laser signal transmitted through the channel enters the beam splitter 9 from an end B of the beam splitter 9, the 90% light is output from an end B1 of the beam splitter 9 as the first optical signal, and the 10% light is output from an end B2 of the beam splitter 9 as the second optical signal.

The receiving device splits the first optical signal into a light in the first polarization direction (referred to as a first polarized light 1 for short below) and a light in the second polarization direction (referred to as a second polarized light 1 for short below) of the first optical signal by using the polarization beam splitter 4.

The receiving device splits the second optical signal into a light in the first polarization direction (referred to as a first polarized light 2 for short below) and a light in the second polarization direction (referred to as a second polarized light 2 for short below) of the second optical signal by using the polarization beam splitter 10.

The light source 5 includes a laser source 51, a pulse module 52, and a beam splitter 53. The laser source 51 generates a continuous wave, and then the pulse module converts the continuous wave into a light pulse, to obtain an LLO. In this example, the beam splitter 53 may be an unbalanced beam splitter, and is configured to split the LLO into two LLOs (referred to as a first LLO and a second LLO for short below).

The receiving device splits the first LLO into a light in the first polarization direction (referred to as a first polarized LLO 1 for short below) and a light in the second polarization direction (referred to as a second LLO 1 for short below) of the first LLO by using the polarization beam splitter 11.

The receiving device splits the second LLO into a light in the first polarization direction (referred to as a first polarized LLO 2 for short below) and a light in the second polarization direction (referred to as a second LLO 2 for short below) of the second LLO by using the polarization beam splitter 12.

The delayer 6 is configured to decrease a phase difference generated when the first LLO 1 and the first polarized light 1 arrive at the coherent detection module 8.

The delayer 7 is configured to decrease a phase difference generated when the second LLO 1 and the second polarized light 1 arrive at the coherent detection module 8.

The delayer 13 is configured to decrease a phase difference generated when the first LLO 2 and the first polarized light 2 arrive at the coherent detection module 8.

The delayer 14 is configured to decrease a phase difference generated when the second LLO 2 and the second polarized light 2 arrive at the coherent detection module 8.

The coherent detection module 8 includes an HD 81, an HD 82, an ADC 83, an HD 88, and an HD 89. The HD 81 and the HD 82 are high-gain detectors that can detect a quantum light. After the first LLO 1 and the first polarized light 1 enter the HD 81, the HD 81 controls the first LLO 1 to interfere with the first polarized light 1, to detect data loaded to the first polarized light 1. Then, the ADC 83 collects a detection result of the HD 81, to obtain the third random data from the quantum light in the first polarization direction of the first optical signal and the detection data from the reference light in the first polarization direction of the first optical signal.

The second LLO 1 and the second polarized light 1 enter the HD 82. The HD 82 controls the second LLO 1 to interfere with the second polarized light 1, to detect data loaded to the second polarized light 1. Then, the ADC 83 collects a detection result of the HD 82, to obtain the fourth random data from the quantum light in the second polarization direction of the first optical signal and the detection data from the reference light in the second polarization direction of the first optical signal. It may be understood that the detection data of the reference light in the first polarization direction of the first optical signal and the detection data of the reference light in the second polarization direction of the first optical signal are first detection data of the reference light in the first optical signal.

The HD 88 and the HD 89 are low-gain detectors that can detect a reference light with a relatively strong light intensity. The HD 88 and the HD 89 detect only the reference light in the second optical signal. Because gains of the HD 88 and the HD 89 are low, saturation is not likely to occur in a detection process, so that reference light detection accuracy can be improved.

After the first LLO 2 and the first polarized light 2 enter the HD 88, the HD 88 controls the first LLO 2 to interfere with the first polarized light 2, to detect data loaded to the first polarized light 2. Then, the ADC 83 collects a detection result of the HD 88, to obtain the detection data from the reference light in the first polarization direction of the second optical signal.

The second LLO 2 and the second polarized light 2 enter the HD 89. The HD 89 controls the second LLO 2 to interfere with the second polarized light 2, to detect data loaded to the second polarized light 2. Then, the ADC 83 collects a detection result of the HD 89, to obtain the detection data from the reference light in the second polarization direction of the second optical signal. It may be understood that the detection data of the reference light in the first polarization direction of the second optical signal and the detection data of the reference light in the second polarization direction of the second optical signal are second detection data of the reference light of the second optical signal.

Step 407: The receiving device obtains reference data of the reference light.

The reference data of the reference light is reference data used when the sending device modulates each reference light. It should be noted that both the receiving device and the sending device may prestore at least two pieces of same reference data, so that when the receiving device needs to calculate a first correction parameter, the receiving device may obtain the reference data of each reference light from a memory of the receiving device.

Optionally, the receiving device may alternatively receive the reference data from the sending device.

Step 408: The receiving device calculates a first correction parameter based on the reference data of the reference light and the detection data.

It should be noted that the receiving device calculates a corresponding first correction parameter in each calculation period. To be specific, in one calculation period, the receiving device may calculate, based on reference data and detection data of two groups of reference lights in the calculation period, a first correction parameter corresponding to a channel change status in the calculation period.

Before a specific implementation of calculating the first correction parameter is described, a rotation effect brought by a channel to an incident light polarization is first described briefly. A segment of long optical fiber may be equivalent to a cascade of many segments of double-folded optical fiber elements, a slow axis direction of each segment is random (for this, refer to the writing of "PHOTONICS: Optical Electronics in Modern Communications, Sixth Edition" written by Amnon Yariv, et al.), and a total Jones matrix of the segment may be represented as follows:

$$J_{fibre} = \begin{bmatrix} a & b \\ -b^* & a^* \end{bmatrix}.$$

Herein, $a = a_0 e^{i\varphi_a}, b = b_0 e^{i\varphi_b}$ are two complex coefficients, and $|a|^2 + |b|^2 = 1$ is satisfied, where $a_0$, $b_0$, and i are all channel parameters. It is assumed that, when the sending device performs modulation, a regular component of an incident light in the first polarization direction is denoted as $(\hat{x}_{b1}, \hat{p}_{b1})$, and a regular component of the incident light in the second polarization direction is denoted as $(\hat{x}_{b2}, \hat{p}_{b2})$. After an emergent light is transmitted through the optical fiber channel, a regular component of the emergent light in the first polarization direction (which is assumed to be a light field mode c) is denoted as $(\hat{x}_c, \hat{p}_c)$, a regular component of the emergent light in the second polarization direction (which is assumed to be a light field mode d) is denoted as $(\hat{x}_d, \hat{p}_d)$. A matrix S represents a deflection parameter, and the following symplectic transformation relationship exists between the regular components of the emergent light and the incident light:

$$\begin{pmatrix} \hat{x}_c \\ \hat{p}_c \\ \hat{x}_d \\ \hat{p}_d \end{pmatrix} = S \begin{pmatrix} \hat{x}_{b1} \\ \hat{p}_{b1} \\ \hat{x}_{b2} \\ \hat{p}_{b2} \end{pmatrix} = \begin{pmatrix} a_0\cos\varphi_a & -a_0\sin\varphi_a & b_0\cos\varphi_b & -b_0\sin\varphi_b \\ a_0\sin\varphi_a & a_0\cos\varphi_a & b_0\sin\varphi_b & b_0\cos\varphi_b \\ -b_0\cos\varphi_b & -b_0\sin\varphi_b & a_0\cos\varphi_a & a_0\sin\varphi_a \\ b_0\sin\varphi_b & -b_0\cos\varphi_b & -a_0\sin\varphi_a & a_0\cos\varphi_a \end{pmatrix} \begin{pmatrix} \hat{x}_{b1} \\ \hat{p}_{b1} \\ \hat{x}_{b2} \\ \hat{p}_{b2} \end{pmatrix}.$$

If a matrix R is denoted as $$R(\theta) = \begin{pmatrix} \cos\theta & \sin\theta \\ -\sin\theta & \cos\theta \end{pmatrix},$$

the matrix S may be briefly denoted as $$S(a, b) = \begin{pmatrix} a_0 R(-\varphi_a) & b_0 R(-\varphi_b) \\ b_0 R(\varphi_b) & a_0 R(\varphi_a) \end{pmatrix}.$$

In a process in which the second laser signal arrives at the receiving device through the optical fiber channel, in addition to the foregoing polarization rotation effect, when the quantum light and the reference light arrive at the receiving device, an unknown phase difference further occurs between the LLO and each of the quantum light and the reference light. For example, with reference to FIG. 7A or FIG. 7B, if the first polarized light and the second polarized light are obtained by performing beam splitting on the second laser signal by the polarization beam splitter 4, the first polarized light and the second polarized light interfere with their respective LLOs through different paths. The delayers 6 and 7 are configured to match a phase difference between the first polarized light and an LLO of the first polarized light and a phase difference between the second polarized light and an LLO of the second polarized light. However, generally, a phase difference cannot implement complete matching. Therefore, it is assumed that an extra phase difference between the light field mode c and an LLO of the light field mode c and an extra phase difference between the light field mode d and an LLO of the light field mode d are $\theta_c$ and $\theta_d$. In this case, a relationship between each of regular components of a light field mode c' and a light field mode d' that finally enter the coherent detection module 8 and each of the regular components of the light field mode c and the light field mode d (in this embodiment, it is assumed that there is no frequency offset between an originating laser and a terminating laser) is as follows:

$$(\hat{x}_{c'}, \hat{p}_{c'}, \hat{x}_{d'}, \hat{p}_{d'})^T = R(\theta_c, \theta_d)(\hat{x}_c, \hat{p}_c, \hat{x}_d, \hat{p}_d)^T, \text{ where}$$

$$R(\theta_c, \theta_d) = \begin{pmatrix} R(\theta_c) & 0 \\ 0 & R(\theta_d) \end{pmatrix}.$$

If a structure of the sending device is shown in FIGS. 6E and 6F or FIGS. 6G and 6H, before the polarization beam splitter 312 performs beam combination on the first polarized light and the second polarized light, it is also very difficult for the delayer 311 to completely compensate for the phase differences of the first polarized light and the second polarized light. Therefore, it may be assumed that differences, relative to reference points of the modulation signal, of actual phases of the first polarized light and the second polarized light when the polarization beam splitter 312 performs beam combination are respectively ($\theta_a$, $\theta_b$) and ($\theta_c$, $\theta_d$). In this case, the following equation can be obtained:

$$(\hat{x}_c, \hat{p}_c, \hat{x}_d, \hat{p}_d)^T = R(\theta_c, \theta_d) \cdot S(a,b) \cdot R(\theta_a, \theta_b)(\hat{x}_{b1}, \hat{p}_{b1}, \hat{x}_{b2}, \hat{p}_{b2})^T.$$

In conclusion, a transformation relationship between a regular component loaded to a quantum light finally detected by the receiving device and a regular component loaded by the sending device to the quantum light through modulation is as follows:

$$\begin{aligned} S' &= R(\theta_c, \theta_d) \cdot S(a, b) \cdot R(\theta_a, \theta_b) \\ &= \begin{pmatrix} R(\theta_c) & 0 \\ 0 & R(\theta_d) \end{pmatrix} \begin{pmatrix} a_0 R(-\varphi_a) & b_0 R(-\varphi_b) \\ b_0 R(\varphi_b) & a_0 R(\varphi_a) \end{pmatrix} \begin{pmatrix} R(\theta_a) & 0 \\ 0 & R(\theta_b) \end{pmatrix} \\ &= \begin{pmatrix} a_0 R(-\varphi_a + \theta_c + \theta_a) & b_0 R(-\varphi_b + \theta_c + \theta_b) \\ b_0 R(\varphi_b + \theta_d + \theta_a) & a_0 R(\varphi_a + \theta_d + \theta_b) \end{pmatrix} \\ &= \begin{pmatrix} a_0 R(-\varphi_{a'} + \theta_0) & b_0 R(-\varphi_{b'} + \theta_0) \\ b_0 R(\varphi_{b'} + \theta_0) & a_0 R(\varphi_{a'} + \theta_0) \end{pmatrix} \\ &= R(\theta_0, \theta_0) \cdot S(a', b') \end{aligned}$$

Herein, $$\varphi_{a'} = \varphi_a - \frac{\theta_c - \theta_d}{2} - \frac{\theta_a - \theta_b}{2}, \varphi_{b'} = \varphi_b - \frac{\theta_c - \theta_d}{2} + \frac{\theta_a - \theta_b}{2},$$

$$\theta_0 = \frac{\theta_a + \theta_b + \theta_c + \theta_d}{2}, a' = a_0 e^{i\varphi_{a'}}, \text{ and } b' = b_0 e^{i\varphi_{b'}}. S'$$

represents a final symplectic transformation matrix, namely, the first correction parameter.

Therefore, the receiving device needs to calculate each element of the foregoing matrix S' or each equivalent unknown variable $a_0, b_0, \varphi_a, \varphi_b, \theta_0$ based on the detection data and the reference data of the reference light.

The following describes, by using one calculation period as an example, a case in which the receiving device calculates the first correction parameter based on the reference data of the reference light and the detection data.

It is assumed that, in one calculation period, reference data of a first group of reference lights in two groups of reference lights is $(x_1, 0, 0, 0)^T$, and detection data is $(M_{c,1}^x, M_{c,1}^p, M_{d,1}^x, M_{d,1}^p)^T$. $(M_{c,1}^x, M_{c,1}^p)^T$ is an average value of regular components of the detected first group of reference lights in the first polarization direction, and $(M_{d,1}^x, M_{d,1}^p)^T$ is an average value of regular components of the detected first group of reference lights in the second polarization direction. Reference data of a second group of reference lights is $(0, 0, x_2, 0)^T$, and detection data is $(M_{c,2}^x, M_{c,2}^p, M_{d,2}^x, M_{d,2}^p)^T$. $(M_{c,2}^x, M_{c,2}^p)^T$ is an average value of regular components of the detected second group of reference lights in the first polarization direction, and $(M_{d,2}^x, M_{d,2}^p)^T$ is an average value of regular components of the detected second group of reference lights in the second polarization direction.

It is assumed that channel attenuation is uniform in various directions, a comprehensive transmittance (including a channel attenuation rate and a sum of attenuation rates of all components in the receiving device) is $\eta$, and impact of vacuum noise is ignored. Therefore, the reference data and the detection data of the two groups of reference lights meet the following equation sets:

$$\begin{cases} M_{c,1}^x = \eta a_0 \cos(\varphi_{a'} - \theta_0) x_1 \\ M_{c,1}^p = \eta a_0 \sin(\varphi_{a'} - \theta_0) x_1 \\ M_{d,1}^x = -\eta b_0 \cos(\varphi_{b'} + \theta_0) x_1 \\ M_{d,1}^p = \eta b_0 \sin(\varphi_{b'} + \theta_0) x_1 \end{cases}, \begin{cases} M_{c,2}^x = \eta b_0 \cos(\varphi_{b'} - \theta_0) x_2 \\ M_{c,2}^p = \eta b_0 \sin(\theta_{b'} - \theta_0) x_2 \\ M_{d,2}^x = \eta a_0 \cos(\varphi_{a'} + \theta_0) x_2 \\ M_{d,2}^p = -\eta a_0 \sin(\varphi_{a'} + \theta_0) x_2 \end{cases}.$$

The following equations can be obtained by analyzing the foregoing equation sets:

$$W_1 = (M_{c,1}^x)^2 + (M_{c,1}^p)^2 + (M_{d,1}^x)^2 + (M_{d,1}^p)^2 = (\eta x_1)^2,$$

$$W_2 = (M_{c,2}^x)^2 + (M_{c,2}^p)^2 + (M_{d,2}^x)^2 + (M_{d,2}^p)^2 = (\eta x_2)^2.$$

Therefore, it can be learned, through calculation, that a first correction parameter matrix S' is as follows:

$$S' = \begin{pmatrix} M_{c,1}^x/\sqrt{W_1} & -M_{c,1}^p/\sqrt{W_1} & M_{c,2}^x/\sqrt{W_2} & -M_{c,2}^p/\sqrt{W_2} \\ M_{c,1}^p/\sqrt{W_1} & M_{c,1}^x/\sqrt{W_1} & M_{c,2}^p/\sqrt{W_2} & M_{c,2}^x/\sqrt{W_2} \\ M_{d,1}^x/\sqrt{W_1} & -M_{d,1}^p\sqrt{W_1} & M_{d,2}^x/\sqrt{W_2} & -M_{d,2}^p/\sqrt{W_2} \\ M_{d,1}^p/\sqrt{W_1} & M_{d,1}^x/\sqrt{W_1} & M_{d,2}^p\sqrt{W_2} & M_{d,2}^x/\sqrt{W_2} \end{pmatrix}.$$

Further, it is assumed that elements in the first row and the third row of the matrix S' are respectively represented as $z_1, z_2, z_3, z_4, z_5, z_6, z_7, z_8$, and the obtained matrix S' is as follows:

$$S' = \begin{pmatrix} z_1 & z_2 & z_3 & z_4 \\ -z_2 & z_1 & -z_4 & z_3 \\ z_5 & z_6 & z_7 & z_8 \\ -z_6 & z_5 & -z_8 & z_7 \end{pmatrix}.$$

It may be understood that, for any two groups of reference lights, for example, reference data of a first group of reference lights is $(X_1, X_2, Y_1, Y_2)^T$ and detection data is $(M_{c,1}^x, M_{c,1}^p, M_{d,1}^x, M_{d,1}^p)^T$, and reference data of a second group of reference lights is $(X_3, X_4, Y_3, Y_4)^T$ and detection data is $(M_{c,2}^x, M_{c,2}^p, M_{d,2}^x, M_{d,2}^p)^T$, all elements in the first correction parameter matrix S' may be obtained by substituting the four pieces of data into the following equation sets:

$$\begin{cases} M_{c,1}^x = \eta(X_1 z_1 + X_2 z_2 + Y_1 z_3 + Y_2 z_4) \\ M_{c,1}^p = \eta(-X_1 z_2 + X_2 z_1 - Y_1 z_4 + Y_2 z_3) \\ M_{d,1}^x = \eta(X_1 z_5 + X_2 z_6 + Y_1 z_7 + Y_2 z_8) \\ M_{d,1}^p = \eta(-X_1 z_6 + X_2 z_5 - Y_1 z_8 + Y_2 z_7) \end{cases},$$

$$\begin{cases} M_{c,2}^x = \eta(X_3 z_1 + X_4 z_2 + Y_3 z_3 + Y_4 z_4) \\ M_{c,2}^p = \eta(-X_3 z_2 + X_4 z_1 - Y_3 z_4 + Y_4 z_3) \\ M_{d,2}^x = \eta(X_3 z_5 + X_4 z_6 + Y_3 z_7 + Y_4 z_8) \\ M_{d,2}^p = \eta(-X_3 z_6 + X_4 z_5 - Y_3 z_8 + Y_4 z_7) \end{cases}.$$

It should be noted that a matrix $$\begin{pmatrix} X_1 & X_2 & Y_1 & Y_2 \\ X_2 & -X_1 & Y_2 & -Y_1 \\ X_3 & X_4 & Y_3 & Y_4 \\ X_4 & -X_3 & Y_4 & -Y_3 \end{pmatrix}$$

constituted by the reference data $(X_1, X_2, Y_1, Y_2)^T$ and the reference data $(X_3, X_4, Y_3, Y_4)^T$ of the two groups of reference lights in the calculation period is a full-rank matrix. Therefore, $z_1, z_2, z_3, z_4, z_5, z_6, z_7, z_8$ obtained by using the reference data and the detection data of the two groups of reference lights are all unique. Therefore, the first correction parameter matrix S' corresponding to the calculation period may be obtained.

Optionally, when a structure of the receiving device is shown in FIG. 7C, from a point A shown in FIG. 7C at which the light pulse in the second laser signal enters the channel to the HD 81 (a point C1 shown in FIG. 7C) and the HD 82 (a point C2 shown in FIG. 7C) of the receiving device, rotation changes of the light pulse on the regular components in the two polarization directions may include two parts: A first part is a polarization rotation effect brought by the channel to the second laser signal from the point A at which the light pulse enters the channel to an input port of the beam splitter 9, namely, a point B shown in FIG. 7C (in this example, states of output ports B1 and B2 are the same as the point B of the beam splitter 9). A second part is that, from the output port B1 of the beam splitter 9 to the point C1 and the point C2, different phase differences of the first polarized light 1 and the second polarized light 1 are $\theta_{C1}, \theta_{C2}$.

Therefore, a relationship between each of regular components of the light pulse at the point C1 and the point C2 (in other words, regular components in the first polarization direction and the second polarization direction when the first optical signal arrives at the HD 81 and the HD 82) and each of regular components of the light pulse in the first polarization direction and the second polarization direction at the point A may be expressed as follows:

$$(\hat{x}_{C1}, \hat{p}_{C1}, \hat{x}_{C2}, \hat{p}_{C2})^T = R_C S(\hat{x}_{A1}, \hat{p}_{A1}, \hat{x}_{A2}, \hat{p}_{A2})^T,$$

where $$S = \begin{pmatrix} a_0 R(-\varphi_q) & b_0 R(-\varphi_b) \\ -b_0 R(\varphi_b) & a_0 R(\varphi_a) \end{pmatrix}, R_C = \begin{pmatrix} R(\theta_{C1}) & 0 \\ 0 & R(\theta_{C2}) \end{pmatrix}.$$

In addition, from the point A at which the light pulse enters the channel to the HD 88 (a point D1 shown in FIG. 7C) and the HD 89 (a point D2 shown in FIG. 7C) of the receiving device, rotation changes of the light pulse on the regular components in the two polarization directions may also include two parts: A first part is a polarization rotation effect brought by the channel from the point A at which the light pulse enters the channel to the point B of the beam splitter 9. A second part is that, from a output port B2 of the beam splitter 9 to the point D1 and the point D2, different phase differences of the first polarized light 2 and the second polarized light 2 are $\theta_{D1}, \theta_{D2}$.

A relationship between each of regular components of the light pulse at the point D1 and the point D2 (in other words, regular components in the first polarization direction and the second polarization direction when the second optical signal arrives at the HD 88 and the HD 89) and each of regular components of the light pulse in the first polarization direction and the second polarization direction at the point A may be expressed as follows:

$$(\hat{x}_{D1}, \hat{p}_{D1}, \hat{x}_{D2}, \hat{p}_{D2})^T = R_D S(\hat{x}_{A1}, \hat{p}_{A1}, \hat{x}_{A2}, \hat{p}_{A2})^T,$$

where $$R_D = \begin{pmatrix} R(\theta_{D1}) & 0 \\ 0 & R(\theta_{D2}) \end{pmatrix}.$$

It may be understood that the matrix S indicates a change caused by a long-distance channel optical fiber, and a change rate of the matrix S is relatively high. $R_C$ and $R_D$ indicate a change caused by a relatively short connection optical fiber in the receiving device, and change rates of $R_C$ and $R_D$ are relatively low.

After obtaining the second detection data by using the HD 88 and the HD 89, the receiving device may calculate an overall transformation matrix $S_2$ of the second optical signal, where $S2=R_D S$.

For the first detection data obtained by the receiving device by using the HD 81 and the HD 82, to measure a quantum light, the HD 81 and the HD 82 are high-gain detectors, and an amplitude of electrical noise is relatively large in a process of detecting the first optical signal. Therefore, accuracy of a result of measuring the reference light in the first optical signal by the HD 81 and the HD 82 is lower than that of a result of measuring the reference light in the second optical signal by the HD 88 and the HD 89. A relationship between the first detection data and the second detection data may be shown as follows:

$$(\hat{x}_{C1,ref}\hat{p}_{C1,ref}\hat{x}_{C2,ref}\hat{p}_{C2,ref})^T = R_C R_D^{-1}(\hat{x}_{D1,ref}\hat{p}_{D1,ref}\hat{x}_{D2,ref}\hat{p}_{D2,ref})^T + (\hat{N}_{1x}, \hat{N}_{1p}, \hat{N}_{2x}, \hat{N}_{2p})^T.$$

A phase $(\hat{N}_{1x}, \hat{N}_{1p}, \hat{N}_{2x}, \hat{N}_{2p})^T$ represents noise (including vacuum noise and electrical noise).

$R_C$ and $R_D$ are matrices with a relatively low change rate, and bring a same transformation effect to reference lights in a plurality of adjacent calculation periods. Therefore, after a cross-correlation operation is performed on measurement results of the HD 81 and the HD 82 and measurement results of the HD 88 and the HD 89 in the plurality of adjacent periods, a linear equation set may be obtained. In this example, because of randomicity of noise measurement, when averaging is performed in the cross-correlation operation, a variance of noise may be reduced. In other words, impact of the noise on estimation uncertainty is reduced.

For example, two groups of cross-correlation data: $\langle \hat{x}_{C1,ref} \hat{x}_{D1,ref} \rangle$ (which represents an average value of a product of the x component of the reference light in the first polarization direction of the first optical signal and the x component of the reference light in the first polarization direction of the second optical signal), and $\langle \hat{x}_{C1,ref}, \hat{p}_{D1,ref} \rangle$ (which represents an average value of a product of the x component of the reference light in the first polarization direction of the first optical signal and the p component of the reference light in the first polarization direction of the second optical signal) are used as an example. The following equation set may be obtained by performing a cross-correlation operation on the two groups of data:

$$\langle \hat{x}_{C1,ref}\hat{x}_{D1,ref}\rangle = \cos(\theta_{C1}-\theta_{D1})\langle \hat{x}_{D1,ref}\hat{x}_{D1,ref}\rangle +$$
$$\sin(\theta_{C1}-\theta_{D1})\langle \hat{p}_{D1,ref}\hat{x}_{D1,ref}\rangle +$$
$$\sum_{\{C1x,C1p,C2x,C2p\}}\langle \hat{N}_k, \hat{x}_{D1,ref}\rangle$$
$$\langle \hat{x}_{C1,ref}\hat{p}_{D1,ref}\rangle = \cos(\theta_{C1}-\theta_{D1})\langle \hat{x}_{D1,ref}\hat{p}_{D1,ref}\rangle +$$
$$\sin(\theta_{C1}-\theta_{D1})\langle \hat{p}_{D1,ref}^2\rangle + \sum_{\{C1x,C1p,C2x,C2p\}}\langle \hat{N}_k, \hat{x}_{D1,ref}\rangle.$$

Equation set (1)

The noise is not associated with any data. Therefore, with reference to a feature that the noise is approximately 0 after averaging is performed, the foregoing equation set (1) may be approximately represented as an equation set (2).

$$\langle \hat{x}_{C1,ref}\hat{x}_{D1,ref}\rangle = \cos(\theta_{C1}-\theta_{D1})\langle \hat{x}_{D1,ref}\hat{x}_{D1,ref}\rangle + \sin(\theta_{C1}-\theta_{D1})\langle \hat{p}_{D1,ref}\hat{x}_{D1,ref}\rangle$$
$$\langle \hat{x}_{C1,ref}\hat{p}_{D1,ref}\rangle = \cos(\theta_{C1}-\theta_{D1})\langle \hat{x}_{D1,ref}\hat{p}_{D1,ref}\rangle + \sin(\theta_{C1}-\theta_{D1})\langle \hat{p}_{D1,ref}^2\rangle$$

Equation set (2).

$R(\theta_{C1})R^{-1}(\theta_{D1})$ may be obtained by using the foregoing equation set (2).

Likewise, $R(\theta_{C2})R^{-1}(\theta_{D2})$ may be obtained based on $\langle \hat{x}_{C2,ref}\hat{x}_{D2,ref}\rangle$ and $\langle \hat{x}_{C2,ref}\hat{p}_{D2,ref}\rangle$. Therefore, a matrix $R_C R_D^{-1}$ may be obtained based on the obtained $R(\theta_{C1})R^{-1}(\theta_{D1})$ and $R(\theta_{C2})R^{-1}(\theta_{D2})$.

Further, after the matrix $R_C R_D^{-1}$ is obtained, a transformation matrix generated when the quantum light arrives at the HD 81 and the HD 82 may be calculated, namely:

$$S_1 = R_C S = R_C R_D^{-1} R_D S = R_C R_D^{-1} S_2.$$

It may be understood that the matrix $S_1$ is the first correction parameter.

After the receiving device obtains the first correction parameter through calculation, the receiving device and/or the sending device may perform a data correction operation by using the first correction parameter, so that the sending device and the receiving device can determine two pieces of same random data.

With reference to four possible implementations, the following describes, by using an example, a case in which the receiving device and/or the sending device may perform a data correction operation by using the first correction parameter.

In an example, as shown in FIG. 4, after step 408, the method further includes the following step:

Step 409: The receiving device performs data correction on the third random data and the fourth random data based on the first correction parameter.

In this example, the receiving device directly performs a data correction operation on the detected random data. In an example in which the first correction parameter is the foregoing matrix S', $(x_{B1}, p_{B1})$ and $(x_{B2}, p_{B2})$ are respectively the third random data and the fourth random data that are detected by the receiving device. The receiving device may multiply $(x_{B1}, p_{B1}, x_{B2}, p_{B2})$ by an inverse matrix $S^T$ of the matrix S', to obtain corrected third random data and corrected fourth random data, that is, $(x_{B1}', p_{B2}', x_{B2}', p_{B2}')^T = S'^T (x_{B1}, p_{B1}, x_{B2}, p_{B2})^T$.

It should be noted that, it is assumed that the first random data loaded by the sending device to the quantum light in the first polarization direction is $(x_{A1}, p_{A1})$, and the second random data loaded by the sending device in the second polarization direction is $(x_{A2}, p_{A2})$. In this case, the following relationship exists between $(x_{B1}, p_{B1}, x_{B2}, p_{B2})$ and $(x_{A1}, p_{A1}, x_{A2}, p_{A2})$:

$$(x_{B1}, p_{B1}, x_{B2}, p_{B2})^T = \lambda \cdot S'(x_{A1}, p_{A1}, x_{A2}, p_{A2})^T + (N_{A1x}, N_{A1p}, N_{A2x}, N_{A2p})^T.$$

Herein, N represents vacuum noise, and $\lambda$ represents a parameter related to a modulation variance. Because the matrix S' is unitary, the following transformation may be obtained based on a feature of the unitary matrix:

$$(x_{B1}', p_{B1}', x_{B2}', p_{B2}')^T = S'^T(x_{B1}, p_{B1}, x_{B2}, p_{B2})^T$$
$$= \lambda \cdot S'^T S'(x_{A1}, p_{A1}x_{A2}, p_{A2})^T +$$
$$S'^T(N_{A1x}, N_{A1p}, N_{A2x}, N_{A2p})^T$$
$$= \lambda \cdot (x_{A1}, p_{A1}, x_{A2}, p_{A2})^T +$$
$$(N_{A1x}', N_{A1p}', N_{A2x}', N_{A2p}')^T.$$

Based on the feature of the unitary matrix, it can be learned that respective variances in new noise entries ($N_{A1x}'$, $N_{A1p}'$, $N_{A2x}'$, $N_{A2p}'$) are still a vacuum noise variance, and are not associated with each other. In other words, the foregoing transformation maintains independence of vacuum noise, and the noise is not controlled by an eavesdropper.

It can be learned that the corrected third random data and the corrected fourth random data are maximally associated with the first random data and the second random data that are generated by the sending device.

Figure 8:
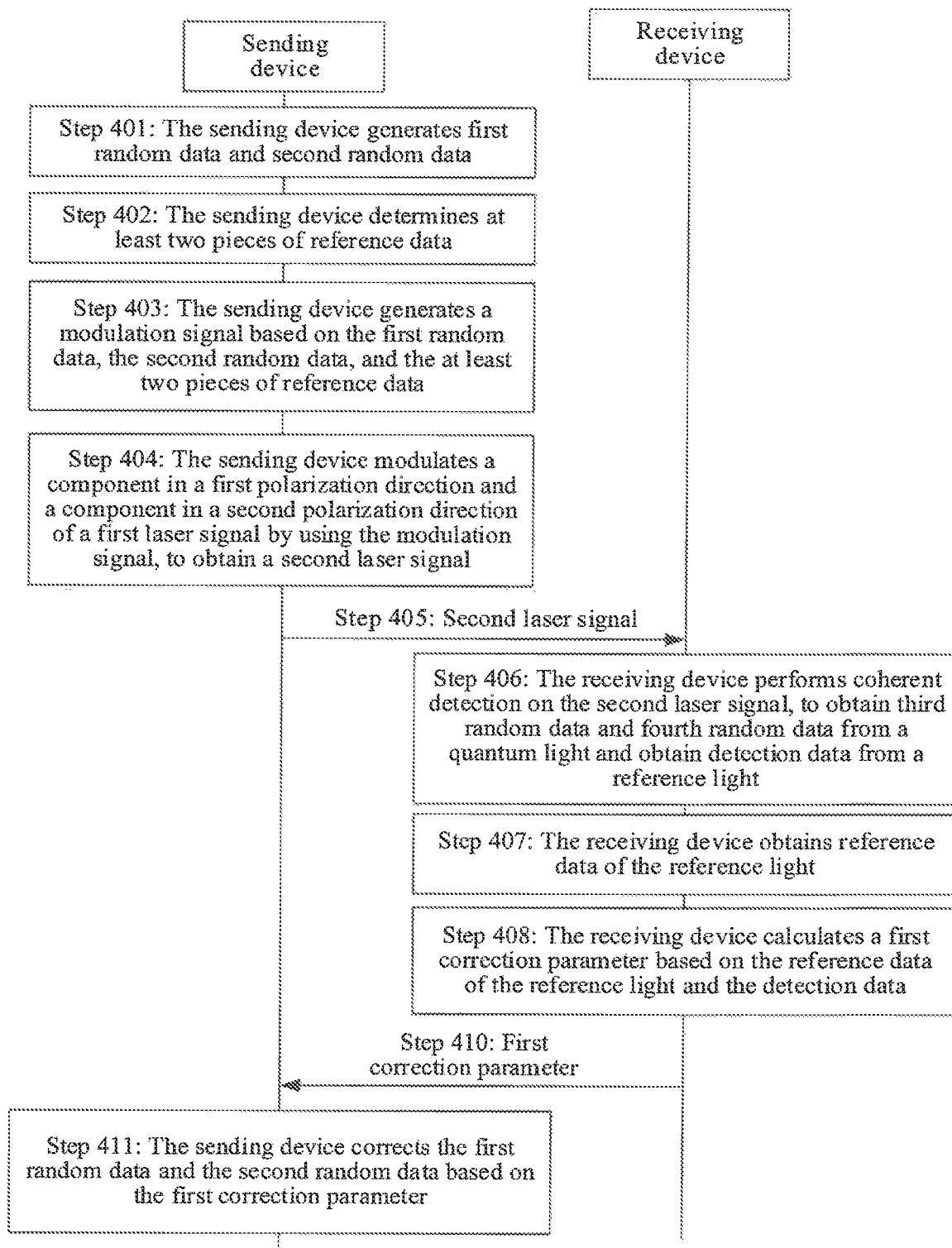
FIG. 8 is a flowchart 2 of an embodiment of a data transmission method according to this application.

Optionally, with reference to FIG. 4, as shown in FIG. 8, after step 408, the method further includes the following steps:

Step 410: The receiving device sends the first correction parameter to the sending device.

Step 411: The sending device performs data correction on the first random data and the second random data based on the first correction parameter.

In this example, the sending device directly performs a data correction operation on the generated random data. In an example in which the first correction parameter is the foregoing matrix S', $(x_{A1}, p_{A1})$ and $(x_{A2}, p_{A2})$ are respectively the first random data and the second random data, and corrected first random data $(x_{A1}', p_{A1}')$ and corrected second random data $(x_{A2}', p_{A2}')$ may be obtained by multiplying $(x_{A1}, p_{A1}, x_{A2}, p_{A2})^T$ by the matrix S', that is, $(x_{A1}', p_{A1}', x_{A2}', p_{A2}')^T = S'(x_{A1}, p_{A1}, x_{A2}, p_{A2})^T$.

It should be noted that, in this example, the sending device performs a correction operation on the random data. For a reverse coordination protocol, random data that is not corrected is enough to complete a key step of security evaluation, in other words, enough to evaluate an amount of information that is about measurement data of the receiving device and that is obtained by the eavesdropper. In this case, the sending device corrects the random data, so that random data of the sending device can be maximally associated with random data of the receiving device. This reduces an amount of check information required for error correction.

Figure 9:
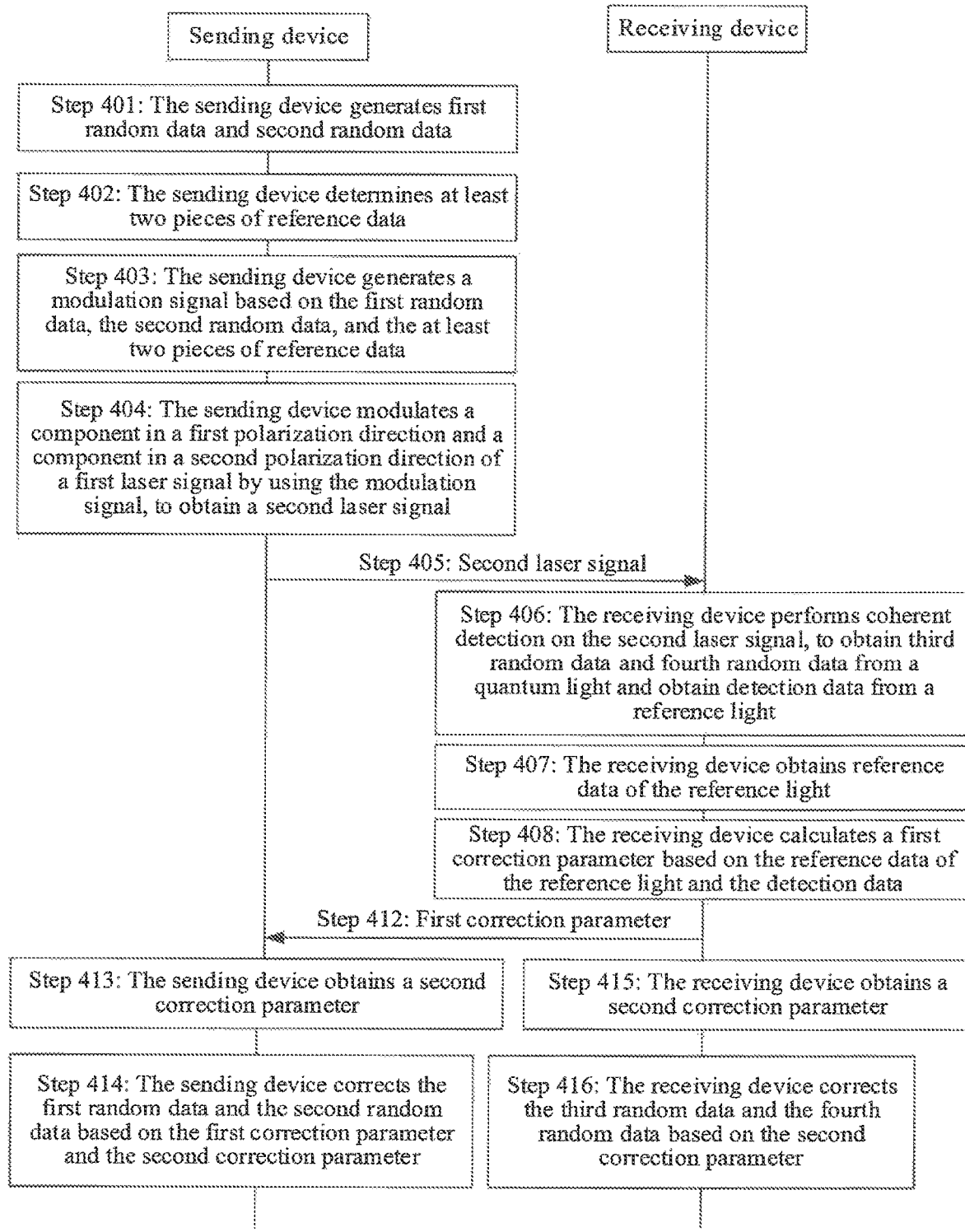
FIG. 9 is a flowchart 3 of an embodiment of a data transmission method according to this application.

Optionally, with reference to FIG. 4, as shown in FIG. 9, after step 408, the method further includes the following steps.

Step 412: The receiving device sends the first correction parameter to the sending device.

Step 413: The sending device obtains a second correction parameter.

Step 414: The sending device performs data correction on the first random data and the second random data based on the first correction parameter and the second correction parameter.

In an example in which the first correction parameter is the foregoing matrix S', and the second correction parameter is $S_3$, $(x_{A1}, p_{A1})$ and $(x_{A2}, p_{A2})$ are respectively the first random data and the second random data, and the corrected first random data $(x_{A1}', p_{A1}')$ and the corrected second random data $(x_{A2}', p_{A2}')$ may be obtained by multiplying $(x_{A1}, p_{A1}, x_{A2}, p_{A2})^T$ by the matrices S' and $S_3$, that is, $(x_{A1}', p_{A1}', x_{A2}', p_{A2}')^T = S_3 S'(x_{A1}, p_{A1}, x_{A2}, p_{A2})^T$.

Step 415: The receiving device obtains a second correction parameter.

Step 416: The receiving device corrects the third random data into fifth random data and corrects the fourth random data into sixth random data based on the second correction parameter.

It is assumed that $(x_{B1}, p_{B1})$ and $(x_{B2}, p_{B2})$ are respectively the third random data and the fourth random data that are detected by the receiving device. The receiving device may multiply $(x_{B1}, p_{B1}, x_{B2}, p_{B2})$ by the matrix $S_3$, to obtain the corrected third random data $(x_{B1}', p_{B1}')$ and the corrected fourth random data $(x_{B2}', p_{B2}')$ that is, $(x_{B1}', p_{B1}', x_{B2}', p_{B2}')^T = S_3(x_{B1}, p_{B1}, x_{B2}, p_{B2})^T$.

In this example, both the receiving device and the sending device perform data correction on the random data, so that the corrected first random data and the corrected second random data are maximally associated with the corrected third random data and the corrected fourth random data.

It should be noted that the second correction parameter may be preset in the sending device and/or the receiving device. In other words, the second correction parameter may be set in the sending device, or the sending device may receive the second correction parameter from the receiving device. Likewise, the second correction parameter may be set in the receiving device, or the receiving device may receive the second correction parameter from the sending device.

Figure 10:
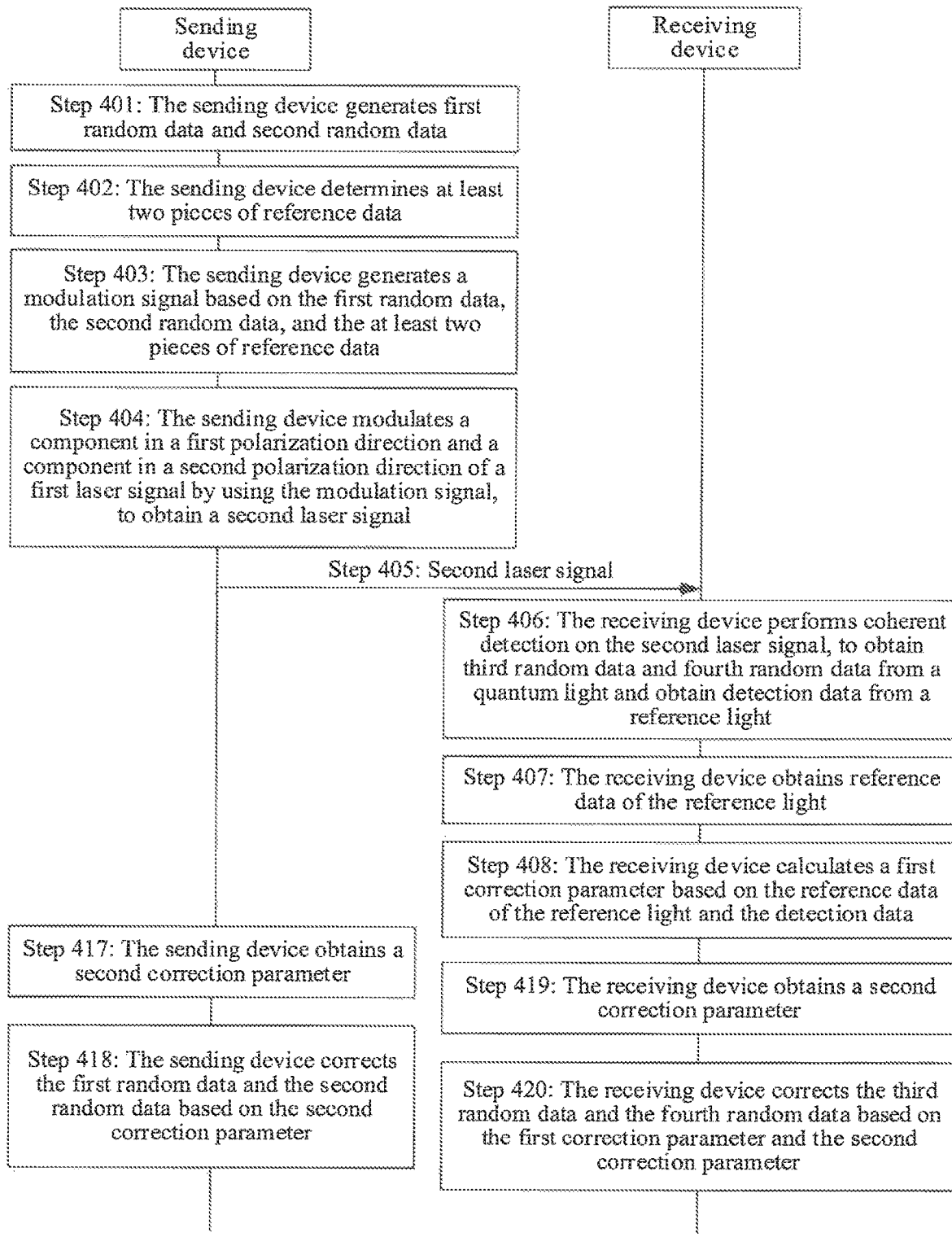
FIG. 10 is a flowchart 4 of an embodiment of a data transmission method according to this application.

Optionally, with reference to FIG. 4, as shown in FIG. 10, after step 408, the method further includes the following steps.

Step 417: The sending device obtains a second correction parameter.

Step 418: The sending device corrects the first random data into seventh random data and corrects the second random data into eighth random data based on the second correction parameter.

For example, it is assumed that the second correction parameter is $S_3$. $(x_{A1}, p_{A1})$ and $(x_{A2}, p_{A2})$ are respectively the first random data and the second random data, and the corrected first random data $(x_{A1}', p_{A2}')$ and the corrected second random data $(x_{A2}', p_{A2}')$ may be obtained by multiplying $(x_{A1}, p_{A1}, x_{A2}, p_{A2})^T$ by $S^3$, that is, $(x_{A1}', p_{A1}', x_{A2}', p_{A2}')^T = S_3(x_{A1}, p_{A1}, x_{A2}, p_{A2})^T$.

Step 419: The receiving device obtains a second correction parameter.

Step 420: The receiving device performs data correction on the third random data and the fourth random data based on the first correction parameter and the second correction parameter.

It is assumed that the first correction parameter is the foregoing matrix S', and $(x_{B1}, p_{B1})$ and $(x_{B2}, p_{B2})$ are respectively the third random data and the fourth random data that are detected by the receiving device. The receiving device may multiply $(x_{B1}, p_{B1}, x_{B2}, p_{B2})$ by an inverse matrix $S^T$ of the matrix S' and the matrix $S_3$, to obtain the corrected third random data $(x_{B1}', p_{B1}')$ and the corrected fourth random data $(x_{B2}', p_{B2}')$, that is, $(x_{B1}', p_{B1}', x_{B2}', p_{B2}')^T = S_3 S'^T(x_{B1}, p_{B1}, x_{B2}, p_{B2})^T$.

In this example, both the receiving device and the sending device perform data correction on the random data, so that the corrected first random data and the corrected second random data are maximally associated with the corrected third random data and the corrected fourth random data.

It should be noted that, after step 408, one of the foregoing listed four data correction operations is selected for execution.

Optionally, after the receiving device and/or the sending device complete/completes the data correction operation, the receiving device and/or the sending device may further perform a post-processing operation on the corrected random data, for example, a post-processing operation such as measurement base comparison and data screening, parameter estimation, data error correction, or confidentiality enhancement.

It can be learned from the foregoing embodiment that, according to the data transmission method provided in this application, the sending device modulates the components in the two perpendicular polarization directions of the first laser signal, so that the obtained second laser signal is separately loaded with the two pieces of independent random data in the two polarization directions. Because the two polarization directions are perpendicular to each other, and there is no crosstalk between the two polarization directions, channel resources are fully used without affecting system security. In this way, a system key rate is doubled, and a channel resource waste is avoided.

Figure 11A:
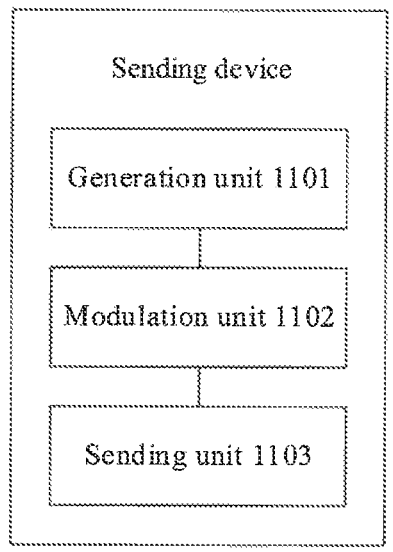
FIG. 11A is a schematic structural diagram 7 of a sending device according to this application.

FIG. 11A is a schematic structural diagram of an embodiment of a sending device according to this application. The sending device is configured to perform the data transmission method corresponding to FIG. 4 and FIG. 8 to FIG. 10.

As shown in FIG. 11A, the sending device includes a generation unit 1101, a modulation unit 1102, and a sending unit 1103.

The generation unit 1101 is configured to generate first random data and second random data.

The generation unit 1101 is further configured to determine at least two pieces of reference data. Any two of the at least two pieces of reference data meet the following condition:

One piece of reference data $(X_1, X_2, Y_1, Y_2)^T$ is different from the other piece of reference data $(X_3, X_4, Y_3, Y_4)^T$ in the any two pieces of reference data, and a matrix $$\begin{pmatrix} X_1 & X_2 & Y_1 & Y_2 \\ X_2 & -X_1 & Y_2 & -Y_1 \\ X_3 & X_4 & Y_3 & Y_4 \\ X_4 & -X_3 & Y_4 & -Y_3 \end{pmatrix}$$

constituted by $(X_1, X_2, Y_1, Y_2)^T$ and $(X_3, X_4, Y_3, Y_4)^T$ is a full-rank matrix.

The generation unit 1101 is further configured to generate a modulation signal based on the first random data, the second random data, and the at least two pieces of reference data.

The modulation unit 1102 is configured to modulate a component in a first polarization direction and a component in a second polarization direction of a first laser signal by using the modulation signal generated by the generation unit 1101, to obtain a second laser signal. The first polarization direction and the second polarization direction are perpendicular to each other, and the second laser signal includes a quantum light and a reference light.

Each calculation period in the second laser signal includes one group of quantum lights and two groups of reference lights. The group of quantum lights is loaded with the first random data in the first polarization direction, and the group of quantum lights is loaded with the second random data in the second polarization direction. A first group of reference lights in the two groups of reference lights is loaded with $X_1$ on an x component in the first polarization direction, the first group of reference lights is loaded with $X_2$ on a p component in the first polarization direction, the first group of reference lights is loaded with $Y_1$ on an x component in the second polarization direction, and the first group of reference lights is loaded with $Y_2$ on a p component in the second polarization direction. A second group of reference lights in the two groups of reference lights is loaded with $X_3$ on the x component in the first polarization direction, the second group of reference lights is loaded with $X_4$ on the p component in the first polarization direction, the second group of reference lights is loaded with $Y_3$ on the x component in the second polarization direction, and the second group of reference lights is loaded with $Y_4$ on the p component in the second polarization direction.

The sending unit 1103 is configured to send the second laser signal.

It should be noted that, in this application, the generation unit 1101 may include a random data source, a processor, a memory, and the like. The modulation unit 1102 may include but is not limited to an intensity modulator, a phase modulator, and a driver required by each modulator. The modulation unit 1102 may further include one or more of a circulator, a beam splitter, a polarization beam splitter, a 90° polarization rotator, a delayer, or the like. The sending unit 1103 may be an output port obtained after a laser signal is modulated.

Figure 11B:
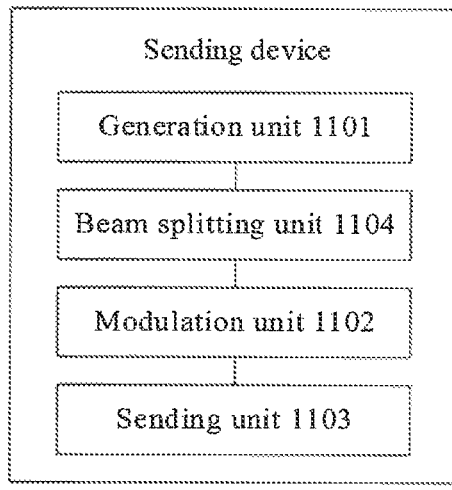
FIG. 11B is a schematic structural diagram 8 of a sending device according to this application.

Optionally, with reference to FIG. 11A, as shown in FIG. 11B, the sending device further includes a beam splitting unit 1104. The beam splitting unit 1104 is configured to: before the modulation unit 1102 modulates the component in the first polarization direction and the component in the second polarization direction of the first laser signal by using the modulation signal, to obtain the second laser signal, split the first laser signal into a component light in the first polarization direction and a component light in the second polarization direction.

Optionally, that the beam splitting unit 1104 splits the first laser signal into a component light in the first polarization direction and a component light in the second polarization direction specifically includes: splitting the first laser signal into the component light in the first polarization direction and the component light in the second polarization direction by using a polarization beam splitter PBS or a beam splitter BS.

It may be understood that the beam splitting unit 1104 in this application may include a polarization beam splitter and/or a beam splitter.

For example, the modulation unit 1102 and the beam splitting unit 1104 may be the dual polarization modulation module 3 shown in any one of FIGS. 6A and 6B to FIG. 6I. It may be understood that, by using FIGS. 6A and 6B as an example, the sending unit may be the output port 313 of the circulator 31, and by using FIGS. 6E and 6F as an example, the sending unit may be the output port 3123 of the polarization beam splitter 312.

Optionally, a quantity of modulation signals is 2, and that the modulation unit 1102 modulates the first laser signal by using the modulation signal, to obtain a second laser signal specifically includes: splitting the first laser signal into the component light in the first polarization direction and the component light in the second polarization direction; modulating the component light in the first polarization direction by using a first modulation signal of the two modulation signals, and modulating the component light in the second polarization direction by using a second modulation signal of the two modulation signals; performing 90° polarization rotation on a modulated component light in the first polarization direction; delaying a modulated component light in the second polarization direction, so that the modulated component light in the first polarization direction overlaps with the modulated component light in the second polarization direction in time domain; and performing beam combination on a component light in the first polarization direction that is obtained after the 90° polarization rotation and a delayed component light in the second polarization direction, to obtain the second laser signal.

Optionally, that the generation unit 1101 generates a modulation signal based on the first random data, the second random data, and the at least two pieces of reference data specifically includes: determining, based on a channel feature, a mode of combination between a signal used to generate a reference light and a signal used to generate a quantum light, where the channel feature is a feature of a channel for transmitting the second laser signal; and permuting and combining the first random data, the second random data, and the at least two pieces of reference data according to the combination mode, to generate the modulation signal.

Optionally, the combination mode is a time division mode, and the time division mode includes a quantity of signals used to generate a quantum light, a quantity of signals used to generate a reference light, and a time-domain distribution manner of the signal used to generate the quantum light and the signal used to generate the reference light.

Optionally, the combination mode includes a frequency division mode, and the frequency division mode includes a quantity of signals used to generate a quantum light, a quantity of signals used to generate a reference light, and a frequency-domain distribution manner of the signal used to generate the quantum light and the signal used to generate the reference light.

Figure 11C:
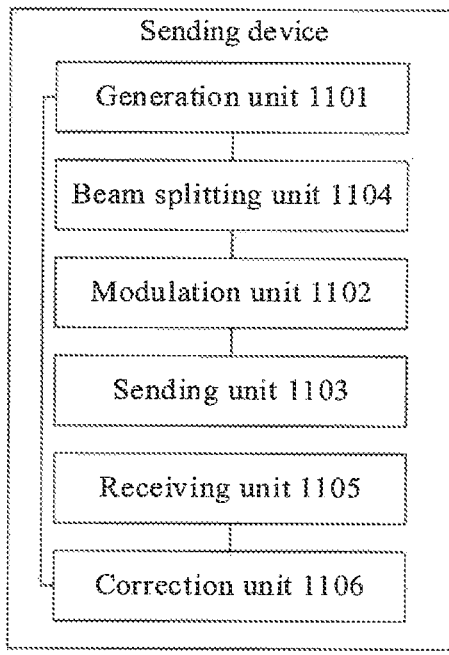
FIG. 11C is a schematic structural diagram 9 of a sending device according to this application.

Optionally, with reference to FIG. 11B, as shown in FIG. 11C, the sending device further includes a receiving unit 1105 and a correction unit 1106. The receiving unit 1105 is configured to receive a first correction parameter sent by a receiving device. The correction unit 1106 is configured to perform data correction on the first random data and the second random data based on the first correction parameter received by the receiving unit 1105.

Figure 11D:
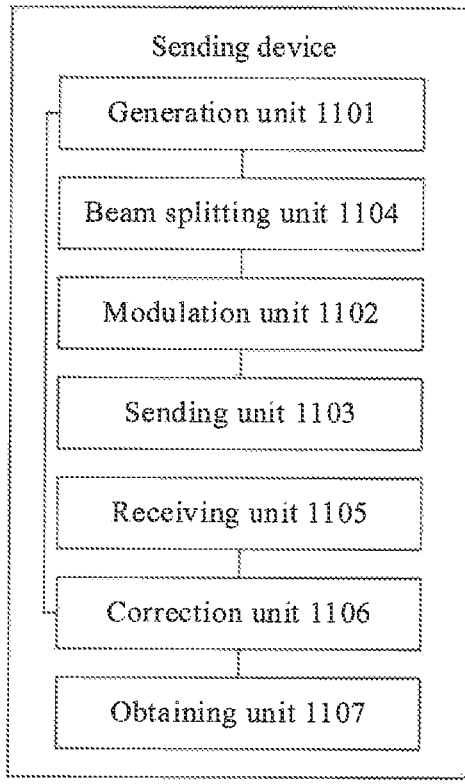
FIG. 11D is a schematic structural diagram 10 of a sending device according to this application.

Optionally, with reference to FIG. 11B, as shown in FIG. 11D, the sending device further includes a receiving unit 1105, an obtaining unit 1107, and a correction unit 1106.

The receiving unit 1105 is configured to receive a first correction parameter sent by the receiving device.

The obtaining unit 1107 is configured to obtain a second correction parameter.

The correction unit 1106 is configured to perform data correction on the first random data and the second random data based on the second correction parameter obtained by the obtaining unit 1107 and the first correction parameter received by the receiving unit 1105.

Figure 11E:
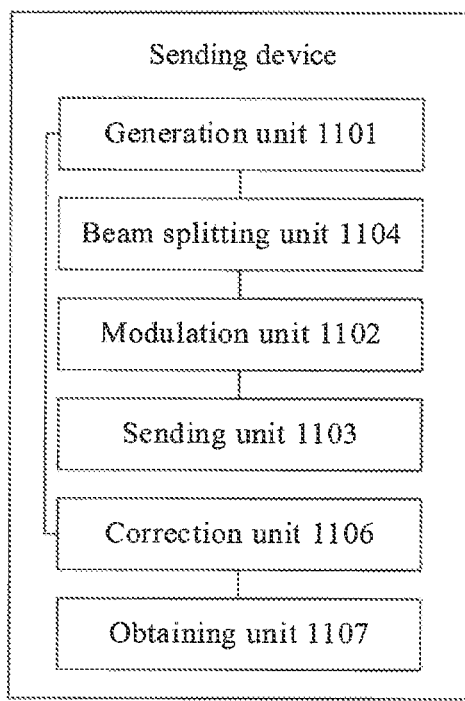
FIG. 11E is a schematic structural diagram 11 of a sending device according to this application.

Optionally, with reference to FIG. 11B, as shown in FIG. 11E, the sending device further includes an obtaining unit 1106 and a correction unit 1107.

The obtaining unit 1107 is configured to obtain a second correction parameter.

The correction unit 1106 is configured to perform data correction on the first random data and the second random data based on the second correction parameter obtained by the obtaining unit 1107.

It should be noted that the receiving unit may be a wireless communications interface or a wired communications interface, and the correction unit and the obtaining unit may be a combination of a processor and a memory.

The sending device provided in this application modulates the components in the two perpendicular polarization directions of the first laser signal, so that the obtained second laser signal is separately loaded with the two pieces of independent random data in the two polarization directions. Because the two polarization directions are perpendicular to each other, and there is no crosstalk between the two polarization directions, channel resources are fully used without affecting system security. In this way, a system key rate is doubled, and a channel resource waste is avoided.

Figure 12A:
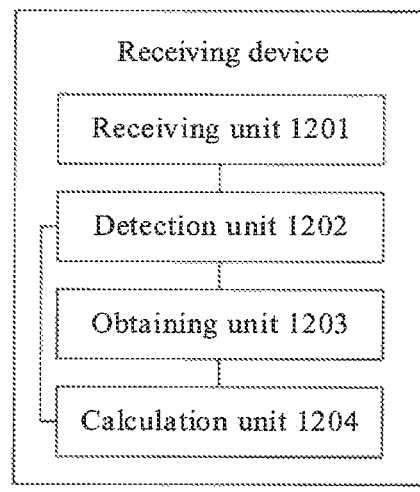
FIG. 12A is a schematic structural diagram 7 of a receiving device according to this application.

FIG. 12A is a schematic structural diagram of an embodiment of a receiving device according to this application. The receiving device is configured to perform the data transmission method corresponding to FIG. 4 and FIG. 8 to FIG. 10.

As shown in FIG. 12A, the receiving device includes a receiving unit 1201, a detection unit 1202, an obtaining unit 1203, and a calculation unit 1204.

The receiving unit 1201 is configured to receive a second laser signal, and the second laser signal includes a quantum light and a reference light.

The detection unit 1202 is configured to perform coherent detection on the second laser signal received by the receiving unit 1201, to obtain third random data and fourth random data from the quantum light and obtain detection data from the reference light.

The obtaining unit 1203 is configured to obtain reference data of the reference light, and the reference data is used when the sending device modulates the reference light.

The calculation unit 1204 is configured to calculate a first correction parameter based on the reference data of the reference light that is obtained by the obtaining unit 1203 and the detection data detected by the detection unit 1202.

Each group of quantum lights and two groups of reference lights in the second laser signal constitute one calculation period, reference data $(X_1, X_2, Y_1, Y_2)^T$ of a first group of reference lights in the two groups of reference lights is different from reference data $(X_3, X_4, Y_3, Y_4)^T$ of a second group of reference lights in the two groups of reference lights, and a matrix $$\begin{pmatrix} X_1 & X_2 & Y_1 & Y_2 \\ X_2 & -X_1 & Y_2 & -Y_1 \\ X_3 & X_4 & Y_3 & Y_4 \\ X_4 & -X_3 & Y_4 & -Y_3 \end{pmatrix}$$

is a full-rank matrix. $X_1$ is reference data with which the first group of reference lights is loaded on an x component in a first polarization direction, $X_2$ is reference data with which the first group of reference lights is loaded on a p component in the first polarization direction, $Y_1$ is reference data with which the first group of reference lights is loaded on an x component in a second polarization direction, and $Y_2$ is reference data with which the first group of reference lights is loaded on a p component in the second polarization direction. $X_3$ is reference data with which the second group of reference lights is loaded on the x component in the first polarization direction, $X_4$ is reference data with which the second group of reference lights is loaded on the p component in the first polarization direction, $Y_3$ is reference data with which the second group of reference lights is loaded on the x component in the second polarization direction, and $Y_4$ is reference data with which the second group of reference lights is loaded on the p component in the second polarization direction.

It should be noted that, in this application, the receiving unit 1201 may be an interface for connecting the receiving device and an optical fiber channel, for example, an input interface of a BS or a PBS for connecting the receiving device and the optical fiber channel. The detection unit may include components such as a locally local oscillator light source, a BHD, an HD, an ADC, a delayer, a beam splitter, and a polarization beam splitter. The obtaining unit and the calculation unit may be a combination of a memory and a processor.

For example, for structures of the receiving unit and the detection unit in the receiving device, refer to a schematic structural diagram shown in any one of FIG. 7A to FIG. 7C. By using FIG. 7A as an example, the receiving unit may be an input port for connecting the polarization beam splitter 4 and the channel. By using FIG. 7C as an example, the receiving unit may be an input port for connecting the beam splitter 9 and the channel.

Optionally, the detection data includes a first part of detection data and a second part of detection data, and that the detection unit 1202 performs coherent detection on the second laser signal, to obtain third random data and fourth random data from the quantum light and obtain detection data from the reference light specifically includes: splitting the second laser signal into a first optical signal and a second optical signal; performing coherent detection on the first optical signal in a first coherent detection manner, to obtain the first part of detection data from a reference light in the first optical signal and obtain the third random data and the fourth random data from a quantum light in the first optical signal; and performing coherent detection on the second optical signal in a second coherent detection manner, to obtain the second part of detection data from a reference light in the second optical signal.

Figure 12B:
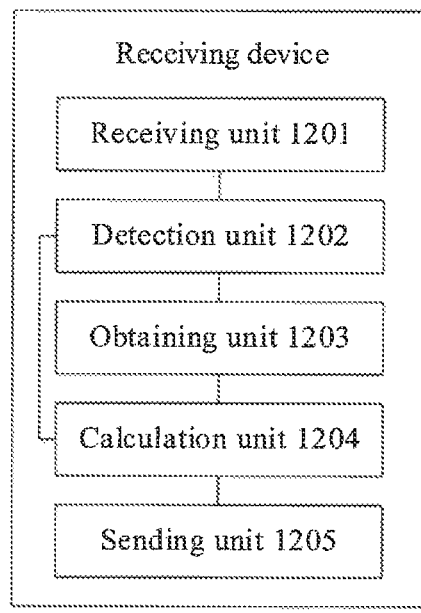
FIG. 12B is a schematic structural diagram 8 of a receiving device according to this application.

Optionally, with reference to FIG. 12A, as shown in FIG. 12B, the receiving device further includes a sending unit 1205. The sending unit 1205 is configured to: after the calculation unit 1204 calculates the first correction parameter based on the reference data of the reference light and the detection data, send, to the sending device, the first correction parameter calculated by the calculation unit 1204.

It should be noted that the receiving unit may be a communications interface, for example, a wireless interface or a wired interface.

Figure 12C:
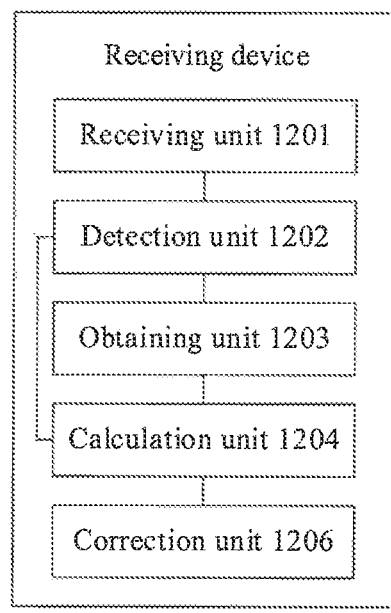
FIG. 12C is a schematic structural diagram 9 of a receiving device according to this application.

Optionally, with reference to FIG. 12A, as shown in FIG. 12C, after the receiving device calculates the first correction parameter based on the reference data of the reference light and the detection data, the receiving device further includes a correction unit 1206.

The correction unit 1206 is configured to: after the calculation unit 1204 calculates the first correction parameter based on the reference data of the reference light and the detection data, perform data correction on the third random data and the fourth random data based on the first correction parameter calculated by the calculation unit 1204.

Figure 12D:
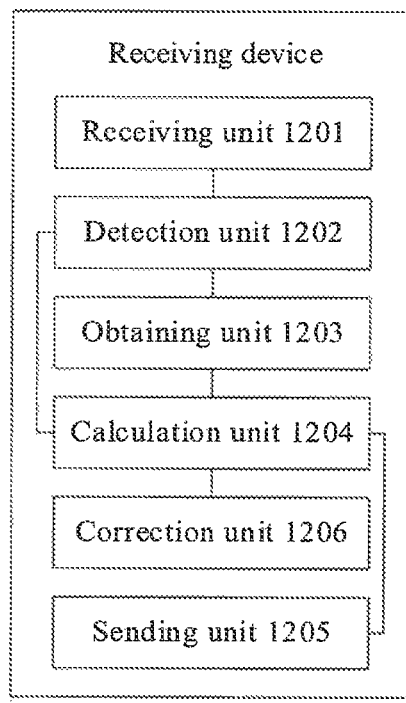
FIG. 12D is a schematic structural diagram 10 of a receiving device according to this application.

Optionally, with reference to FIG. 12B, as shown in FIG. 12D, the receiving device further includes a correction unit 1206.

The obtaining unit 1203 is further configured to obtain a second correction parameter after the detection unit 1202 obtains the third random data and the fourth random data.

The correction unit 1206 is configured to perform data correction on the third random data and the fourth random data based on the second correction parameter obtained by the obtaining unit 1203.

Optionally, with reference to FIG. 12B, as shown in FIG. 12D, the receiving device further includes a correction unit 1206.

The obtaining unit 1203 is further configured to obtain a second correction parameter after the calculation unit 1204 calculates the first correction parameter based on the reference data of the reference light and the detection data.

The correction unit 1206 is configured to perform data correction on the third random data and the fourth random data based on the first correction parameter calculated by the calculation unit 1204 and the second correction parameter obtained by the obtaining unit 1203.

It should be noted that the sending unit may be a wired communications interface or a wireless communications interface, and the correction unit may be a combination of a processor and a memory.

It can be learned from the foregoing embodiment that, according to the receiving device provided in this application, the third random data and the fourth random data can be obtained from the second laser signal. The sending device separately loads the two pieces of independent random data in the two polarization directions of the second laser signal, the two polarization directions are perpendicular to each other, and there is no crosstalk between the two polarization directions. Therefore, channel resources are fully used without affecting system security. In this way, a system key rate is doubled, and a channel resource waste is avoided.

In specific implementation, the present invention further provides a computer storage medium. The computer storage medium may store a program, and when the program is executed, some or all of the steps in each embodiment of the method provided in the present invention may be performed. The storage medium may be a magnetic disk, an optical disc, a read-only memory (ROM), a random access memory (RAM), or the like.

A person skilled in the art may clearly understand that the technologies in the embodiments of the present invention may be implemented by software in addition to a necessary general hardware platform. Based on such an understanding, the technical solutions of the embodiments of the present invention essentially or the part contributing to the prior art may be implemented in a form of a software product. The computer software product may be stored in a storage medium such as a ROM/RAM, a magnetic disk, or an optical disc, and includes several instructions for instructing a computer device (which may be a personal computer, a server, or a network device) to perform the method described in the embodiments or some parts of the embodiments of the present invention.

Same or similar parts in the embodiments of this specification may be mutually referenced. Especially, the embodiments of the sending device and the receiving device are basically similar to the method embodiments, and therefore are described briefly. For related parts, refer to the descriptions in the method embodiments.

The foregoing implementations of the present invention are not intended to limit the protection scope of the present invention.

What is claimed is:

1. A method, comprising:

generating, by a device, first random data and second random data;

determining, by the device, at least two pieces of reference data, wherein any two of the at least two pieces of reference data meet the following condition:

one piece of reference data $(X_1, X_2, Y_1, Y_2)^T$ is different from the other piece in the any two pieces of reference data, $(X_3, X_4, Y_3, Y_4)^T$ and a matrix $$\begin{bmatrix} X1 & X2 & Y1 & Y2 \\ X2 & -X1 & Y2 & -Y1 \\ X3 & X4 & Y3 & Y4 \\ X4 & -X3 & Y4 & -Y3 \end{bmatrix}$$

constituted by the $(X_1, X_2, Y_1, Y_2)^T$ and the $(X_3, X_4, Y_3, Y_4)^T$ and is a full-rank matrix;

generating, by the device, a modulation signal based on the first random data, the second random data, and the at least two pieces of reference data;

modulating, by the device, a component in a first polarization direction and a component in a second polarization, direction of a first laser signal by using the modulation signal, to obtain a second laser signal, wherein the first polarization direction and the second polarization direction are perpendicular to each other, and the second laser signal comprises a quantum light and a reference light, wherein each calculation period in the second laser signal comprises one group of quantum lights and two groups of reference lights, the one group of quantum lights is loaded with the first random data in the first polarization direction, and the one group of quantum lights is loaded with the second random data in the second polarization direction; a first group of reference lights in the two groups of reference lights is loaded with $X_1$ on an x component in the first polarization direction, the first group of reference lights is loaded $X_2$ with on a p component in the first polarization direction, the first group of reference lights is loaded with $Y_1$ on an x component in the second polarization direction, and the first group of reference lights is loaded with $Y_2$ a p component in the second polarization direction; and a second group of reference lights in the two groups of reference lights is loaded with $X_3$ on the x component in the first polarization direction, the second group of reference lights is loaded with $X_4$ on the p component in the first polarization direction, the second group of reference lights is loaded with $Y_3$ on the x component in the second polarization direction, and the second group of reference lights is loaded with $Y_4$ on the p component in the second polarization direction; and sending, by the device, the second laser signal.

2. The method according to claim 1, wherein a quantity of modulation signals is two (2), and the modulating, by the device, the first laser signal by using the modulation signal, to obtain the second laser signal comprises:

modulating, by the device, the component light in the first polarization direction by using a first modulation signal of the two modulation signals, and modulating the component light in the second polarization direction by using a second modulation signal of the two modulation signals;

performing, by the device, 90° polarization rotation on the modulated component light in the first polarization direction;

delaying, by the device, the modulated component light in the second polarization direction, so that the modulated component light in the first polarization direction overlaps with the modulated component light in the second polarization direction in time domain; and performing, by the device, beam combination on the component light in the first polarization direction that is obtained after the 90° polarization rotation and the delayed component light in the second polarization direction, to obtain the second laser signal.

3. The method according to claim 1, wherein the generating, by the device, the modulation signal based on the first random data, the second random data, and the at least two pieces of reference data comprises:

determining, by the device based on a channel feature, a mode of combination between a signal used to generate a reference light and a signal used to generate a quantum light, wherein the channel feature is a feature of a channel for transmitting the second laser signal; and permuting and combining, by the device, the first random data, the second random data, and the at least two pieces of reference data according to the combination mode, to generate the modulation signal.

4. The method according to claim 1, wherein the method further comprises:

receiving, by the device, a first correction parameter sent by another device; and performing, by the device, data correction on the first random data and the second random data based on the first correction parameter.

5. A method, comprising:

receiving, by a device, a second laser signal, wherein the second laser signal comprises a quantum light and a reference light;

performing, by the device, coherent detection on the second laser signal, to obtain third random data and fourth random data from the quantum light and obtain detection data from the reference light;

obtaining, by the device, reference data of the reference light; and calculating, by the device, a first correction parameter based on the reference data of the reference light and the detection data, wherein one group of quantum lights and two groups of reference lights in the second laser signal constitute one calculation period, reference data $(X_1, X_2, Y_1, Y_2)^T$ of a first group of reference lights in the two groups of reference lights is different from reference data $(X_3, X_4, Y_3, Y_4)^T$ of a second group of reference lights in the two groups of reference lights, and a matrix $$\begin{bmatrix} X1 & X2 & Y1 & Y2 \\ X2 & -X1 & Y2 & -Y1 \\ X3 & X4 & Y3 & Y4 \\ X4 & -X3 & Y4 & -Y3 \end{bmatrix}$$

is a full-rank matrix; $X_1$ is reference data with which the first group of reference lights is loaded on an x component in a first polarization direction $X_2$ s reference data with which the first group of reference lights is loaded on a p component in the first polarization direction, $Y_1$ is reference data with which the first group of reference lights is loaded on an x component a second polarization direction, and $Y_2$ is reference data with which the first group of reference lights is loaded on a p component in the second polarization direction; and $X_3$ is reference data with which the second group of reference lights is loaded on the x component in the first polarization direction, $X_4$ is reference data with which the second group of reference lights is loaded on the p component in the first polarization direction, $Y_3$ is reference data with which the second group of reference lights is loaded on the x component in the second polarization direction, and $Y_4$ is reference data with which the second group of reference lights is loaded on the p component in the second polarization direction.

6. The method according to claim 5, wherein the detection data comprises a first part of detection data and a second part of detection data, and the performing, by the device, coherent detection on the second laser signal, to obtain the third random data and the fourth random data from the quantum light and obtain detection data from the reference light comprises:

splitting, by the device, the second laser signal into a first optical signal and a second optical signal;

performing, by the device, coherent detection on the first optical signal in a first coherent detection manner, to obtain the first part of detection data from a reference light in the first optical signal and obtain the third random data and the fourth random data from a quantum light in the first optical signal; and performing, by the device, coherent detection on the second optical signal in a second coherent detection manner, to obtain the second part of detection data from a reference light in the second optical signal.

7. The method according to claim 5, wherein after the calculating, by the device, the first correction parameter based on the reference data of the reference light and the detection data, the method further comprises:

performing, by the device, data correction on the third random data and the fourth random data based on the first correction parameter.

8. A device, comprising:

a random number generator configured to:

generate first random data and second random data, determine at least two pieces of reference data, wherein any two of the at least two pieces of reference data meet fee following condition:

one piece of reference data $(X_1, X_2, Y_1, Y_2)^T$ is different from the other piece in the any two pieces of reference data $(X_3, X_4, Y_3, Y_4)^T$ and a matrix $$\begin{bmatrix} X1 & X2 & Y1 & Y2 \\ X2 & -X1 & Y2 & -Y1 \\ X3 & X4 & Y3 & Y4 \\ X4 & -X3 & Y4 & -Y3 \end{bmatrix}$$

constituted by the $(X_1, X_2, Y_1, Y_2)^T$ and the $(X_3, X_4, Y_3, Y_4)^T$ is a full-rank matrix, and generate a modulation signal based on the first random data, the second random data, and the at least two pieces of reference data;

a modulator, configured to modulate a component in a first polarization direction and a component in a second polarization direction of a first laser signal by using the modulation signal generated by the random number generator to obtain a second laser signal, wherein the first polarization direction and the second polarization direction are perpendicular to each other, and fee second laser signal comprises a quantum light and a reference light, wherein each calculation period in the second laser signal comprises one group of quantum lights and two groups of reference lights, a component of the group of quantum lights in the first polarization direction is the first random data, and a component of the group of quantum lights in the second polarization direction is the second random data; an x component of a first group of reference lights in the two groups of reference lights in the first polarization direction is $X_1$ a p component of the first group of reference lights in the first polarization direction is, $X_2$ an x component of the first group of reference lights in the second polarization direction is $Y_1$, and a p component of the first group of reference lights in the second polarization direction is $Y_2$; and an x component of a second group of reference lights in the two groups of reference lights in the first polarization direction is $X_3$, a p component of the second group of reference lights in the first polarization direction is $X_4$ an x component of the second group of reference lights in the second polarization direction is $Y_3$, and a p component of the second group of reference lights in the second polarization direction is $Y_4$; and a communications interface, configured to send the second laser signal.

9. The device according to claim 8, wherein a quantity of modulation signals is two (2), and the modulator, to modulate a first laser signal by using the modulation signal, to obtain the second laser signal, is configured to:

split the first laser signal into the component light in the first polarization direction and the component light in the second polarization direction;

modulate the component light in the first polarization direction by using a first modulation signal of the two modulation signals, and modulate the component light in the second polarization direction by using a second modulation signal of the two modulation signals;

perform 90° polarization rotation on the modulated component light in the first polarization direction;

delay the modulated component light in the second polarization direction, so that the modulated component light in the first polarization direction overlaps with the modulated component light In the second polarization direction in time domain; and perform beam combination on the component light in the first polarization direction that is obtained after the 90° polarization rotation and the delayed component light in the second polarization direction, to obtain the second laser signal.

10. The device according to claim 8, wherein the random number generator, to generate the modulation signal based on the first random data, the second random data, and the at least two pieces of reference data, is configured to: determine, based on a channel feature, a mode of combination between a signal used to generate a reference light and a signal used to generate a quantum light, wherein the channel feature is a feature of a channel for transmitting the second laser signal; and permute and combine the first random data, the second random data, and the at least two pieces of reference data according to the combination mode, to generate the modulation signal.

11. The device according to claim 10, wherein the combination mode is a time division mode, and the time division mode comprises a quantity of signals used to generate the quantum light, a quantity of signals used to generate the reference light, and a time-domain distribution manner of the signal used to generate the quantum light and the signal used to generate the reference light.

12. The device according to claim 10, wherein the combination mode comprises a frequency division mode, and the frequency division mode comprises a quantity of signals used to generate the quantum light, a quantity of signals used to generate the reference light, and a frequency-domain distribution manner of the signal used to generate the quantum light and the signal used to generate the reference light.

13. The device according to claim 8, wherein the device further comprises a another communications interface and a processor;

the another communications interface is configured to receive a first correction parameter sent by another device; and the processor is configured to perform data correction on the first random data and the second random data based on the first correction parameter received by the another communications interface.

14. The device according to claim 8, wherein the device further comprises a processor, wherein the processor is configured to;

to obtain a second correction parameter; and to perform data correction on the first random data and the second random data based on the second correction parameter obtained by the processor.

15. A device, comprising:

a communications interface, configured to receive a second laser signal, wherein the second laser signal comprises a quantum light and a reference light;

a detector, configured to perform coherent detection on the second laser signal received by the communications interface, to obtain third random data and fourth random data from the quantum light and obtain detection data from the reference light; and a processor configured to:

obtain reference data of the reference light; and calculate a first correction parameter based on the reference data of the reference light that is obtained by the obtaining unit and the detection data, detected by the detector, wherein one group of quantum lights and two groups of reference lights in the second laser signal constitute one calculation period, reference data $(X_1, X_2, Y_1, Y_2)^T$ of a first group of reference lights in the two groups of reference lights is different from reference data $(X_3, X_4, Y_3, Y_4)^T$ of a second group of reference lights in the two groups of reference lights, and a matrix is $$\begin{bmatrix} X1 & X2 & Y1 & Y2 \\ X2 & -X1 & Y2 & -Y1 \\ X3 & X4 & Y3 & Y4 \\ X4 & -X3 & Y4 & -Y3 \end{bmatrix}$$

is a full-rank matrix; $X_1$ is reference data with which the first group of reference lights is loaded on an x component in a first polarization direction, $X_2$ is reference data with which the first group of reference lights is loaded on a p component in the first polarization direction, $Y_1$ is reference data with which the first group of reference lights is loaded on an x component in a second polarization direction, and $Y_2$ is reference data with which the first group of reference lights is loaded on a p component in the second polarization direction; and $X_3$ is reference data with which the second group of reference lights is loaded on the x component in the first polarization direction, $X_4$ is reference data with which the second group of reference lights is loaded on the p component in the first polarization direction, $Y_3$ is reference data with which the second group of reference lights is loaded on the x component in the second polarization direction, and $Y_4$ is reference data with which the second group of reference lights is loaded on the p component in the second polarization direction.

16. The device according to claim 15, wherein the detection data comprises a first part of detection data and a second part of detection data, and the detector, to perform coherent detection on the second laser signal, to obtain third random data and fourth random data from the quantum light and obtain detection data from the reference light, is configured to:
split the second laser signal into a first optical signal and a second optical signal;
perform coherent detection on the first optical signal in a first coherent detection manner, to obtain the first part of detection data from a reference light in the first optical signal and obtain the third random data and the fourth random data from a quantum light in the first optical signal; and
perform coherent detection on the second optical signal in a second coherent detection manner, to obtain the second part of data detection from a reference light in the second optical signal.

17. The device according to claim 15, wherein the device further comprises:
another communications interface, configured to: after the processor calculates the first correction parameter based on the reference data of the reference light and the detection data, send, to another device, the first correction parameter calculated by the processor.

18. The device according to claim 15, wherein the processor is configured to: after calculating the first correction parameter based on the reference data of the reference light and the detection data, perform data correction on the third random data and the fourth random data based on the first correction parameter calculated by the processor.

19. The device according to claim 17, wherein the processor is configured to;
obtain a second correction parameter after the detector obtains the third random data and the fourth random data; and
perform data correction on the third random data and the fourth random data based on the second correction parameter obtained by the processor.

20. The device according to claim 17, wherein the processor is configured to;
obtain a second correction parameter after the processor calculates the first correction parameter based on the reference data of the reference light and the detection data; and
perform data correction on the third random data and the fourth random data based on the first correction parameter calculated by the processor and the second correction parameter obtained by the processor.

* * * * *